US012033468B2

(12) United States Patent
Davis et al.

(10) Patent No.: US 12,033,468 B2
(45) Date of Patent: Jul. 9, 2024

(54) RANDOM BASED GAME OUTCOMES FOR GAMES WITHIN A MULTI-GAME PACKAGE

(71) Applicant: Aristocrat Technologies, Inc., Las Vegas, NV (US)

(72) Inventors: Blake Davis, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/940,104

(22) Filed: Jul. 27, 2020

(65) Prior Publication Data

US 2022/0028218 A1 Jan. 27, 2022

(51) Int. Cl.
*G07F 17/32* (2006.01)

(52) U.S. Cl.
CPC ...... *G07F 17/3258* (2013.01); *G07F 17/3227* (2013.01)

(58) Field of Classification Search
CPC ............. G07F 17/3258; G07F 17/3244; G07F 17/3267
See application file for complete search history.

(56) References Cited

U.S. PATENT DOCUMENTS 6,032,955 A 3/2000 Luciano
6,224,484 B1 5/2001 Okuda
6,776,715 B2 8/2004 Price
7,753,784 B2 7/2010 Baerlocher
7,771,276 B2 8/2010 Beatty
7,862,427 B2 1/2011 Nguyen
8,070,605 B2 12/2011 Tien
8,147,320 B2 4/2012 Englman
8,221,228 B2 * 7/2012 Anderson ........... G07F 17/3244 463/25
8,257,167 B2 9/2012 Fujimori
8,323,101 B2 12/2012 Anderson
8,342,956 B2 1/2013 Anderson
(Continued)

OTHER PUBLICATIONS

"IGT—New Concept MS Legends Pairs Games With Their Own SAP For Jackpot Shoppers," IGT, ClubIQ, Nov. 8, 2019, 4 pages.
(Continued)

*Primary Examiner* — David L Lewis
*Assistant Examiner* — Robert E Mosser
(74) *Attorney, Agent, or Firm* — Blank Rome LLP

(57) ABSTRACT

A multi-game environment for a gaming device is described. A lobby includes a first game and a second game in a multi-game package. The first game is eligible to payout a first stand-alone progressive jackpot and ineligible to payout a second stand-along progressive jackpot. The second game is eligible to payout a second stand-along progressive jackpot and ineligible to payout the first stand-alone progressive jackpot. A round of play in the first game initiates and the first stand-alone progressive jackpot and the second stand-along progressive jackpot adjust according to a funding rate. A first set of random based game outcomes generates for the round of play to randomly determine whether a jackpot feature is triggered. A second set of random based game outcomes is generated to randomly determine whether to payout the first stand-alone progressive jackpot.

20 Claims, 20 Drawing Sheets

(56) References Cited

U.S. PATENT DOCUMENTS

| | | | |
|---|---|---|---|
| 8,348,755 B2 | 1/2013 | Kelly | |
| 8,353,761 B2 | 1/2013 | Kelly | |
| 8,360,869 B2 | 1/2013 | Kelly | |
| 8,382,586 B2 | 2/2013 | Kelly | |
| 8,414,389 B2 | 4/2013 | Cahill | |
| 8,449,387 B2 | 5/2013 | Englman | |
| 8,460,086 B2 | 6/2013 | Joshi | |
| 8,535,147 B2 | 9/2013 | Ward | |
| 8,545,308 B2 | 10/2013 | Walker | |
| 8,585,494 B2 | 11/2013 | Parrinello | |
| 8,622,813 B2 | 1/2014 | Okada | |
| 8,651,946 B1 | 2/2014 | Doyle | |
| 8,715,071 B2 | 5/2014 | Keenan | |
| 8,740,710 B2 | 6/2014 | Kelly | |
| 8,753,196 B2 | 6/2014 | Baerlocher | |
| 8,821,265 B2 | 9/2014 | Englman | |
| 9,039,522 B2 | 5/2015 | Guan | |
| 9,053,602 B2 | 6/2015 | Michaelson | |
| 9,189,921 B2 | 11/2015 | Spencer | |
| 9,230,402 B2 | 1/2016 | Green | |
| 9,311,779 B2 | 4/2016 | Kelly | |
| 9,342,956 B2 | 5/2016 | Hughes | |
| 9,355,521 B2 | 5/2016 | King | |
| 9,378,608 B2 | 6/2016 | Enzminger | |
| 9,430,904 B2 | 8/2016 | Larsen | |
| 9,520,029 B2 | 12/2016 | Guinn | |
| 9,672,694 B2 | 6/2017 | Lowell | |
| 9,741,209 B2 | 8/2017 | Aoki | |
| 9,824,531 B2 | 11/2017 | Iyer | |
| 9,830,777 B2 | 11/2017 | Yoseloff | |
| 9,990,804 B2 | 6/2018 | Aoki | |
| 10,002,494 B2 | 6/2018 | Saffari | |
| 10,008,072 B2 | 6/2018 | Czyzewski | |
| 10,026,269 B2 | 7/2018 | Upton | |
| 10,204,485 B2 | 2/2019 | Korthauer | |
| 10,210,707 B2 | 2/2019 | Suda | |
| 10,210,710 B2 | 2/2019 | Lyons | |
| 10,311,674 B2 | 6/2019 | Nicely | |
| 10,373,435 B2 | 8/2019 | Yoseloff | |
| 11,354,978 B2 | 6/2022 | O'Hara | |
| 2002/0190471 A1 | 12/2002 | Vancura | |
| 2003/0222402 A1 | 12/2003 | Olive | |
| 2005/0239542 A1* | 10/2005 | Olsen | G07F 17/32 463/27 |
| 2006/0142079 A1 | 6/2006 | Ikehara | |
| 2006/0154718 A1 | 7/2006 | Willyard | |
| 2006/0183535 A1 | 8/2006 | Marks | |
| 2007/0060321 A1 | 3/2007 | Vasquez | |
| 2007/0191088 A1* | 8/2007 | Breckner | G07F 17/3258 463/20 |
| 2008/0125211 A1 | 5/2008 | Plowman | |
| 2009/0111561 A1 | 4/2009 | Dewaal | |
| 2011/0195773 A1 | 8/2011 | Michaelson | |
| 2011/0201416 A1 | 8/2011 | Jaffe | |
| 2012/0108324 A1 | 5/2012 | King | |
| 2013/0084950 A1* | 4/2013 | Olsen | G07F 17/3258 463/25 |
| 2013/0252723 A1 | 9/2013 | Nicely | |
| 2014/0213348 A1 | 7/2014 | Vasquez | |
| 2016/0217657 A1 | 7/2016 | Halter | |
| 2016/0314657 A1 | 10/2016 | Buchholz | |
| 2017/0024968 A1 | 1/2017 | Saffari | |
| 2017/0221309 A1 | 8/2017 | Hughes | |
| 2018/0005490 A1 | 1/2018 | Reddicks | |
| 2018/0082531 A1 | 3/2018 | Yoseloff | |
| 2018/0082533 A1 | 3/2018 | Hallerbach | |
| 2018/0225924 A1 | 8/2018 | Cohen | |
| 2022/0028218 A1 | 1/2022 | Davis | |
| 2022/0383692 A1 | 12/2022 | Lyons | |

OTHER PUBLICATIONS

Office Action (Non-Final Rejection) dated Nov. 23, 2021 for U.S. Appl. No. 16/826,124 (pp. 1-7).

Office Action (Notice of Allowance and Fees Due (PTOL-85) dated Mar. 2, 2022 for U.S. Appl. No. 16/826,124 (pp. 1-7).

Office Action (Non-Final Rejection) dated Mar. 24, 2023 for U.S. Appl. No. 17/747,652 (pp. 1-7).

Office Action dated Apr. 17, 2023 for U.S. Appl. No. 16/940,104 (pp. 1-13).

Office Action (Final Rejection) dated Jul. 10, 2023 for U.S. Appl. No. 17/747,652 (pp. 1-9).

Notice of Allowance dated Jul. 21, 2023 for U.S. Appl. No. 17/861,598 (pp. 1-12).

Office Action (Non-Final Rejection) dated Oct. 20, 2023 for U.S. Appl. No. 17/747,652 (pp. 1-8).

* cited by examiner

FIG. 18
1800
602
604A
608A
606A
902A
610
1504
1506
1508
1510
612
604C
604B
604A
TIMBER WOLF
LEGENDS
GRAND
$250,000.11
MAJOR
$500.55
$50.00
$10.00
BET
200
WIN
0
CREDIT
32110
$250,000.11
LEGENDS
200
400
600
800
1000

RANDOM BASED GAME OUTCOMES FOR GAMES WITHIN A MULTI-GAME PACKAGE

BACKGROUND

The disclosure relates generally to the field of user interface (UI) design, electronic gaming devices, and electronic gaming software. More particularly, but not by way of limitation, this disclosure relates to performing gaming device operations that present and generate random based game outcomes for games within a multi-game package.

Electronic gaming machines (EGMs) or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of a game instance (or single play) of a primary or base game. In some cases, a player may qualify for a special mode of the base game, a secondary game feature, or a bonus game feature of the base game by attaining a certain winning combination or triggering event in, or related to, the base game, or after the player is randomly awarded the special mode, secondary game feature, or bonus game feature. In the special mode, secondary game feature, or bonus game feature, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary game features, and/or the amount awarded.

Typical games use a random number generator (RNG) to randomly determine the outcomes (also referenced throughout the disclosure as a "random based game outcome") for the games. Examples of random based game outcomes include slots, video poker, video blackjack, video pachinko, keno, bingo, and lottery outcomes. The games are also designed to return a certain percentage of the amount wagered back to the player over the course of many rounds of play or game instances, which is generally referred to as return to player (RTP) for a game. The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs often depend on usability (e.g., ease of use and player understandability) and new or improved game features to enhance player experiences on the EGMs. Although previous EGMs include various UI features, game features, and backend game processing operations associated with the UI features to improve usability and enhance player experiences, there is a continuous need for further improvement to EGMs and other electronic gaming devices, electronic gaming software, and/or UI design.

SUMMARY

In one implementation, a system comprises memory and a processor operable to interact with the memory. The processor loads a lobby that includes a first game and a second game in a multi-game package. The first game is eligible to trigger a payout of a first stand-alone progressive jackpot and ineligible to trigger a payout of a second stand-along progressive jackpot. The second game is eligible to trigger a payout of a second stand-along progressive jackpot and ineligible to trigger a payout of the first stand-alone progressive jackpot. The processor then initiates a round of play in the first game associated of the multi-game package and adjusts the first stand-alone progressive jackpot and the second stand-along progressive jackpot according to at least one funding rate based on initiation of the round of play. The processor also generates a first set of random based game outcomes for the round of play and randomly determines whether a jackpot feature in the first game is triggered based on the first set of random based game outcomes. The processor randomly determines a second set of random based game outcomes based on a determination that the jackpot feature in the first game is triggered and randomly determines whether the second set of random based game outcome triggers the payout of the first stand-alone progressive jackpot.

In another implementation a method is described to implement a multi-game environment. The method loads a lobby that includes a first game and a second game in a multi-game package. The first game is eligible to trigger a payout of a first game specific jackpot and ineligible to trigger a payout of a second game specific jackpot. The second game is eligible to trigger a payout of a second game specific jackpot and ineligible to trigger a payout of the first game specific jackpot. The method initiates a round of play in the first game associated of the multi-game package and simultaneously adjusts the first game specific jackpot and the second game specific jackpot according to at least one funding rate based on initiation of the round of play. The method generates a first set of random based game outcomes for the round of play and randomly determines whether a jackpot feature in the first game is triggered based on the first set of random based game outcomes. The method randomly determines a second set of random based game outcomes based on a determination that the jackpot feature in the first game is triggered and randomly determines whether the second set of random based game outcome triggers the payout of the first game specific jackpot.

In yet another implementation, a system comprises memory and a processor operable to interact with the memory. The processor is loads a lobby that includes a first game and a second game in a multi-game package. The first game is eligible to trigger a payout of a first game attribute and ineligible to trigger a payout of a second game attribute. The second game is eligible to trigger a payout of a second game attribute and ineligible to trigger a payout of the first game attribute. The processor then initiates a round of play in the first game associated of the multi-game package and adjusts the first game attribute and the second game attribute according to at least one funding rate based on initiation of the round of play. The processor also generates a first set of random based game outcomes for the round of play and randomly determines whether a jackpot feature in the first game is triggered based on the first set of random based game outcomes. The processor randomly determines a second set of random based game outcomes based on a determination that the jackpot feature in the first game is triggered and randomly determines whether the second set of random based game outcome triggers the payout of the first game attribute.

In yet another implementation, a system comprises memory and a processor operable to interact with the memory. The processor presents a lobby that includes a first game and a second game in a multi-game package. The first game is eligible to trigger a payout of a first stand-alone progressive jackpot and ineligible to trigger a payout of a second stand-along progressive jackpot. The second game is eligible to trigger a payout of a second stand-along progressive jackpot and ineligible to trigger a payout of the first stand-alone progressive jackpot. The processor then presents a round of play in the first game associated of the multi-game package and presents an adjustment of the first stand-alone progressive jackpot and the second stand-along progressive jackpot according to at least one funding rate based on initiation of the round of play. The processor also presents a first set of random based game outcomes for the round of play, where a jackpot feature in the first game is triggered based on the first set of random based game outcomes. The processor presents a second set of random based game outcomes based on a determination that the jackpot feature in the first game is triggered, where the second set of random based game outcome triggers the payout of the first stand-alone progressive jackpot.

In another implementation a method is described to implement a multi-game environment. The method presents a lobby that includes a first game and a second game in a multi-game package. The first game is eligible to trigger a payout of a first game specific jackpot and ineligible to trigger a payout of a second game specific jackpot. The second game is eligible to trigger a payout of a second game specific jackpot and ineligible to trigger a payout of the first game specific jackpot. The method presents a round of play in the first game associated of the multi-game package and simultaneously presents an adjustment of the first game specific jackpot and the second game specific jackpot according to at least one funding rate based on initiation of the round of play. The method presents a first set of random based game outcomes for the round of play, where a jackpot feature in the first game is triggered based on the first set of random based game outcomes. The method presents a second set of random based game outcomes based on a determination that the jackpot feature in the first game is triggered, where the second set of random based game outcome triggers the payout of the first game specific jackpot.

In yet another implementation, a system comprises memory and a processor operable to interact with the memory. The processor presents a lobby that includes a first game and a second game in a multi-game package. The first game is eligible to trigger a payout of a first game attribute and ineligible to trigger a payout of a second game attribute. The second game is eligible to trigger a payout of a second game attribute and ineligible to trigger a payout of the first game attribute. The processor then presents a round of play in the first game associated of the multi-game package and presents an adjustment of the first game attribute and the second game attribute according to at least one funding rate based on initiation of the round of play. The processor also presents a first set of random based game outcomes for the round of play, where a jackpot feature in the first game is triggered based on the first set of random based game outcomes. The processor presents a second set of random based game outcomes based on a determination that the jackpot feature in the first game is triggered, where the second set of random based game outcome triggers the payout of the first game attribute.

In one implementation, each of the above described methods, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirting and scope of the invention as defined by the claims. In the drawings, which are not to scale, the same reference numerals are used throughout the description and in the drawing figures for components and elements having the same structure. If applicable, primed reference numerals are used for components and elements having similar function and construction to those components and elements having the same unprimed reference numerals.

DETAILED DESCRIPTION

Figure 1:
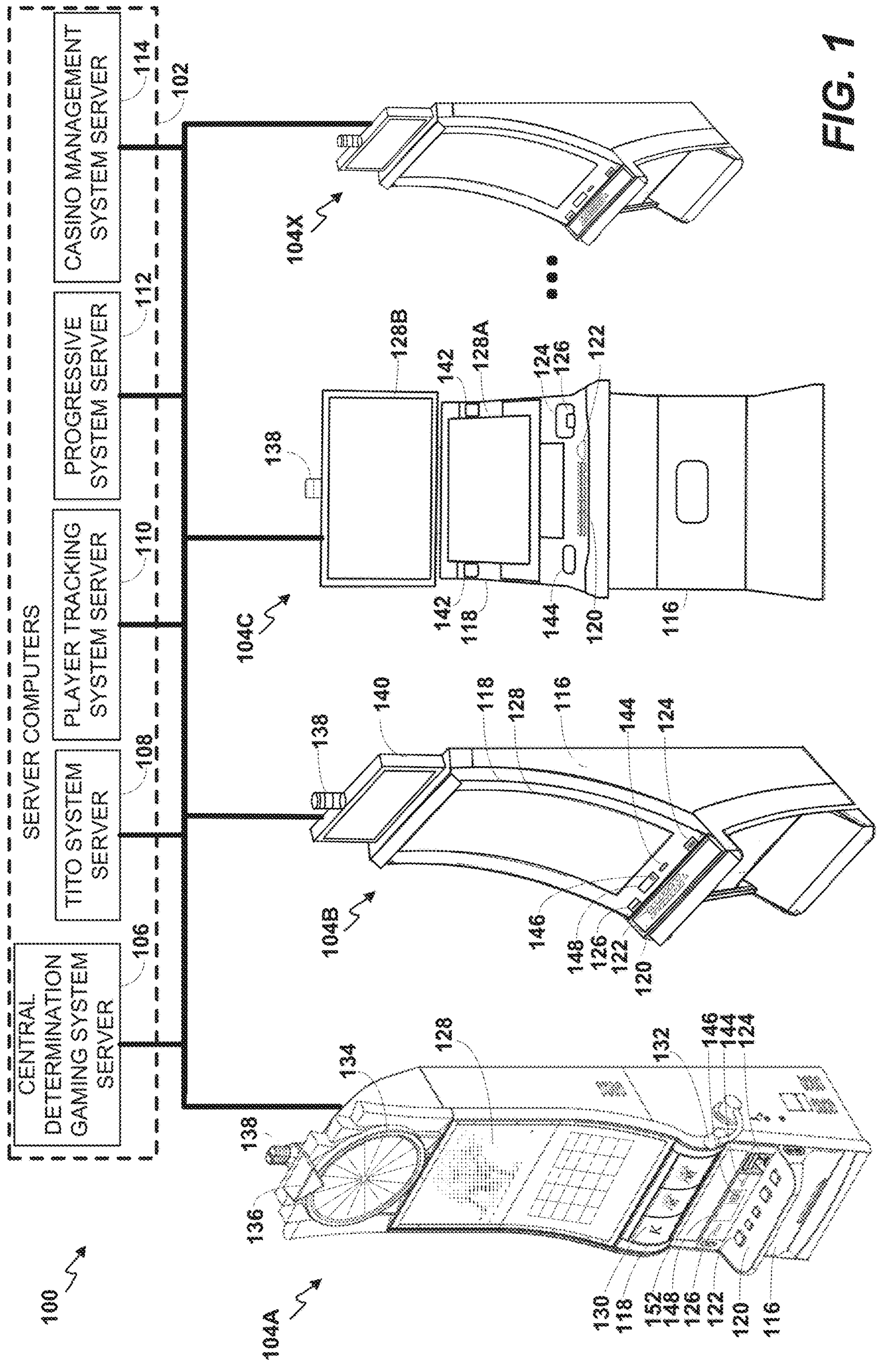
FIG. 1 is an exemplary diagram showing several EGMs networked with various gaming related servers.

The disclosure includes various example implementations that generate random based game outcomes for games in a multi-game package. In one or more implementations, a gaming device is loaded with a multi-game package that provides a lobby that presents a set of games. Within the lobby, the player can utilize the gaming device to select a game to play from the set of games. The lobby also presents game specific jackpots (e.g., major jackpot), where each game specific jackpot is linked to multiple games, and a multi-game jackpot (e.g., grand jackpot) that is shared across the games and/or multiple game devices. After a gaming device receives a player input to select one of the games, the gaming device generates one or more game play windows for the selected game. The gaming device then initiates a round of play (also referred throughout the disclosure as a "game instance") to generate one or more random based game outcomes. When the gaming device executes a game instance for a given game, the gaming device allocates a portion of the wager to contribute to multiple game specific jackpots. As an example, each game is eligible to trigger a specific major jackpot that has an initial prize value of $500. After the gaming device initiates a game instance in one of the games (e.g., game A), the major jackpot across all games (e.g., games A, B, and C) in the multi-game package simultaneously increment up to one or more prize values (e.g., $500.75). For a given game instance in a particular game (e.g., game A), a gaming device can award the game specific jackpot (e.g., major jackpot A) designated for a particular game (e.g., game A), but cannot payout other game specific jackpots (e.g., major jackpots B and C) designated to other games (e.g., games B and C) in the multi-game package. To be eligible to trigger and obtain the game specific jackpots in the other games, the gaming device would need to exit the current game (e.g., game A) and enter one of the other games (e.g., games B or C) in the multi-game package.

For each game, the gaming device could also present within a user interface a separate jackpot metamorphic for each game. For example, if a multi-game package includes three games, game A, game B, and game C, then games A, B, and C would each have its own jackpot metamorphic (e.g., jackpot metamorphics A, B, and C). In one or more implementations, the jackpot metamorphic represents different ranges of metamorphic triggering events that have occurred since triggering a jackpot feature. The metamorphic triggering event may occur, for example, based on landing a jackpot dynamic symbol on a reel. When the jackpot dynamic symbol lands, the gaming device randomly determines whether the jackpot dynamic symbol triggers a jackpot feature. If the jackpot dynamic symbol fails to trigger the jackpot feature, the gaming device determines a metamorphic triggering event occurs and increases the metamorphic triggering event count by one. The gaming device maps the metamorphic triggering event count to one of the metamorphic states, where each metamorphic state corresponds to a range of metamorphic triggering event counts. As the gaming device continues with its rounds of play in the games, the metamorphic states for the different games could vary. Additionally, or alternatively, the multi-game package could link the different games to a multi-game metamorphic that represents a certain number of metamorphic triggering events that occur across the games.

In one or more implementations, one or more games within the multi-game package operate in a multi-play environment. In a multi-play environment, the gaming device generates multiple random based game outcomes for multiple game play windows for a given game instance. Each game play window presents and provides the same game (e.g., having the same game rules, mechanics, and paytables), where RTP for each game play window is combined together to provide a target base game RTP. To vary volatility for a given game instance, the gaming device is setup to select a reel pattern set to use for a set of reels (e.g., reels 1-5) in each game play window. In one example, a gaming device can be configured to allocate 40% of the target game RTP as the target base game RTP. The gaming device includes a reel pattern A and a reel pattern B, where reel pattern A provides an RTP of 90% for a given spin (also referred throughout this disclosure as "spin RTP") and reel pattern B provides a spin RTP of 30%. By utilizing a weighted table that determines what reel patterns to use for each game play window, the base game RTP is set to be 40% of the target game RTP (e.g., 90% target game RTP) while varying volatility amongst the game play windows.

In terms of technical effects, the multi-play and/or multi-game package environment described throughout the disclosure delivers improvements to electronic gaming software, UI design, and/or gaming devices by providing new and/or improved gaming device operations that comply with gaming regulations. Regarding UI focused operations, presenting the multi-play and/or multi-game package environment can improve the usability of the gaming devices, enhance a player's understandability of obtaining certain game outcomes, and provide another approach to presenting how a player could build equity across multiple games in a multi-game package while complying with gaming regulations. With respect to executing new and/or improved gaming device operations, a gaming device is specially programmed to manage multiple jackpot metamorphics across multiple games and link game specific jackpots to multiple games in a manner that complies with gaming regulations. For example, to implement the multi-game package environment, the specially programmed gaming device is setup to simultaneously manage, track, and/or adjust a variety of game specific jackpots and jackpot metamorphics based on rounds of play in a certain game. Additionally, or alternatively, to provide a targeted degree of game volatility, the gaming device can also be specially programmed to utilize different reel strip patterns and lookup tables that determine jackpot triggering events, metamorphic triggering events, and/or payout ranges. These and other technical features are described in greater detail later in the disclosure.

Example Electronic Gaming Servers, Gaming Devices, and Gaming Environments

FIG. 1 illustrates several different models of EGMs that could be specially configured to generate random based game outcomes in a multi-play environment and/or multi-game package environment. As shown in FIG. 1, the EGMs, which are more generally referred to as gaming devices 104A-104X, may be networked to various gaming related servers. Shown is a system 100 in a gaming environment including one or more server computers 102 (e.g., slot servers of a casino) that are in communication, via a communications network, with one or more gaming devices 104A-104X (e.g., EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless TITO system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game feature. Bonus topper wheel 134 is typically used to play a bonus game feature, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.01 or $0.05), paylines, pay tables, and/or various game related graphics. In some implementations, the information panel(s) 152 may be implemented as an additional video display.

Figure 2A:
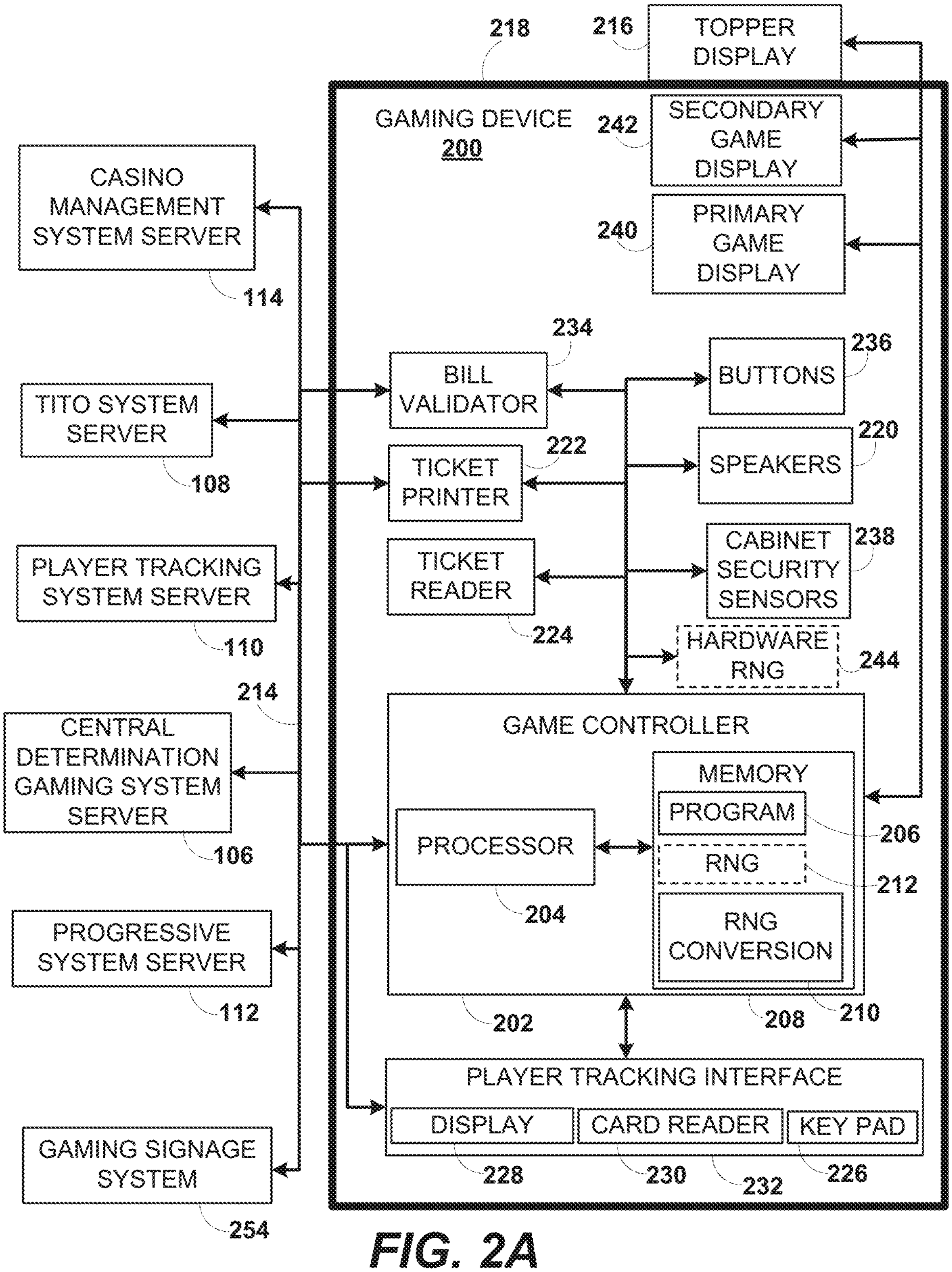
FIG. 2A is a block diagram showing various functional elements of an exemplary EGM.

Gaming devices 104A have traditionally also included a handle 132 typically mounted to the side of main cabinet 116 which may be used to initiate game play. Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game feature display for bonus play, to show game features or attraction activities while a game is not in play, or any other information or media desired by the game designer or operator. In some implementations, the optional topper screen 140 may also or alternatively be used to display progressive jackpots available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus game features, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. Similar to FIG. 1, gaming device 200 can be specially configured to generate random based game outcomes using a repeat accrual meter mechanic. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred throughout this disclosure as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features (e.g., bonus game feature, special mode, secondary game feature, and/or other supplemental game features). In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a predetermined level of RTP (e.g., RTP of at least 75%) for a game (also referenced throughout the disclosure as a "target game RTP"). A game can use one or more lookup tables (also referenced throughout this disclosure as "weighted tables") as part of a technical solution that satisfies regulatory requirements for randomness and RTP. In particular, a lookup table can integrate game features (e.g., trigger events for special modes or bonus game features; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target game RTP. In general, volatility refers to the frequency or probability of an event such as a special mode, payout, etc. For example, to achieve a specific target game RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables and/or reel strips to translate the RNG outcome to a symbol element, stop position for a reel strip, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table and/or reel strips to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive game credit awards based on the outcome of winning instances. The credit balance is decreased by the amount of each wager and increased upon a win. The player can add additional game credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus game feature or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
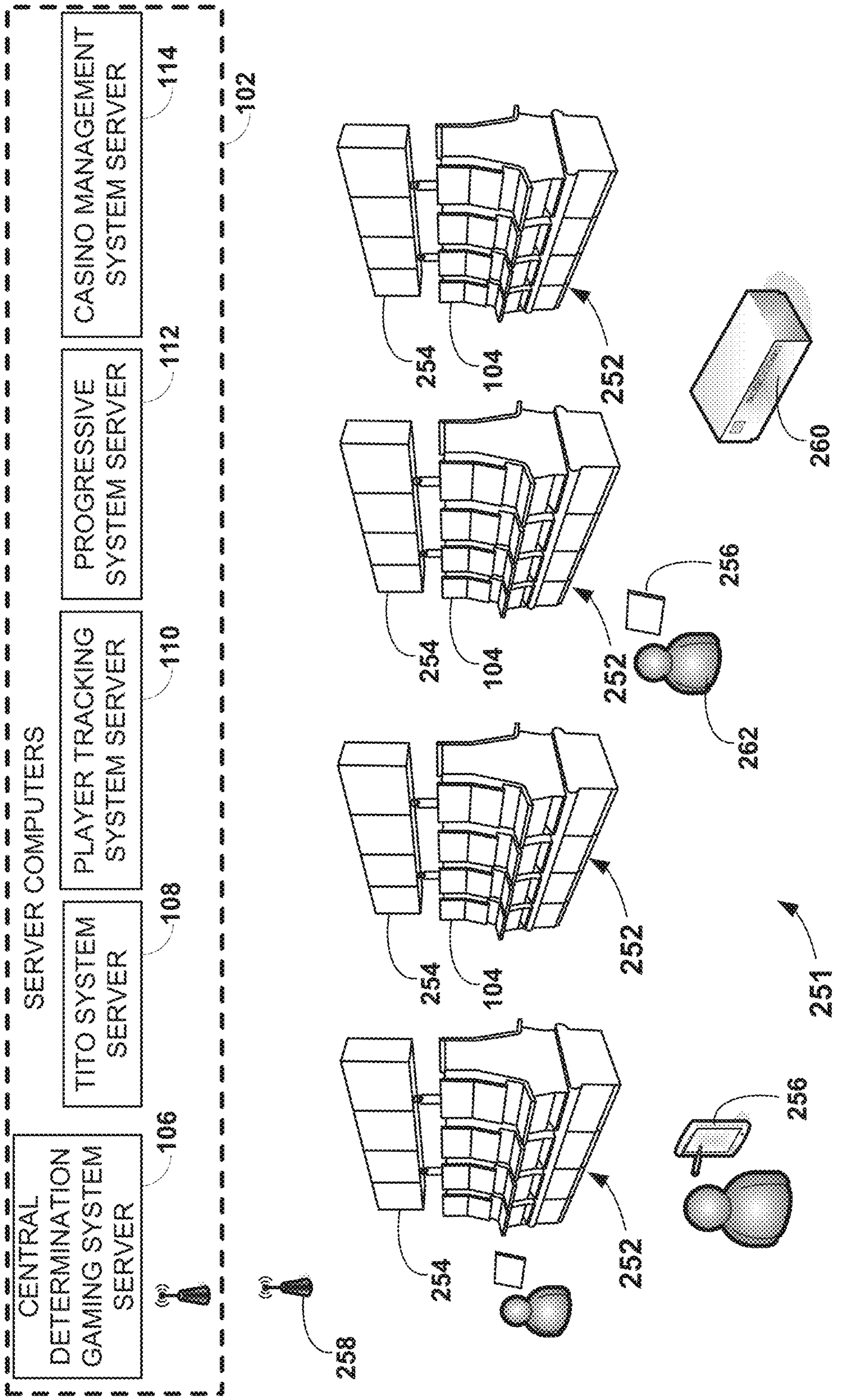
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones, dedicated gaming consoles, and/or other handheld or portable devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
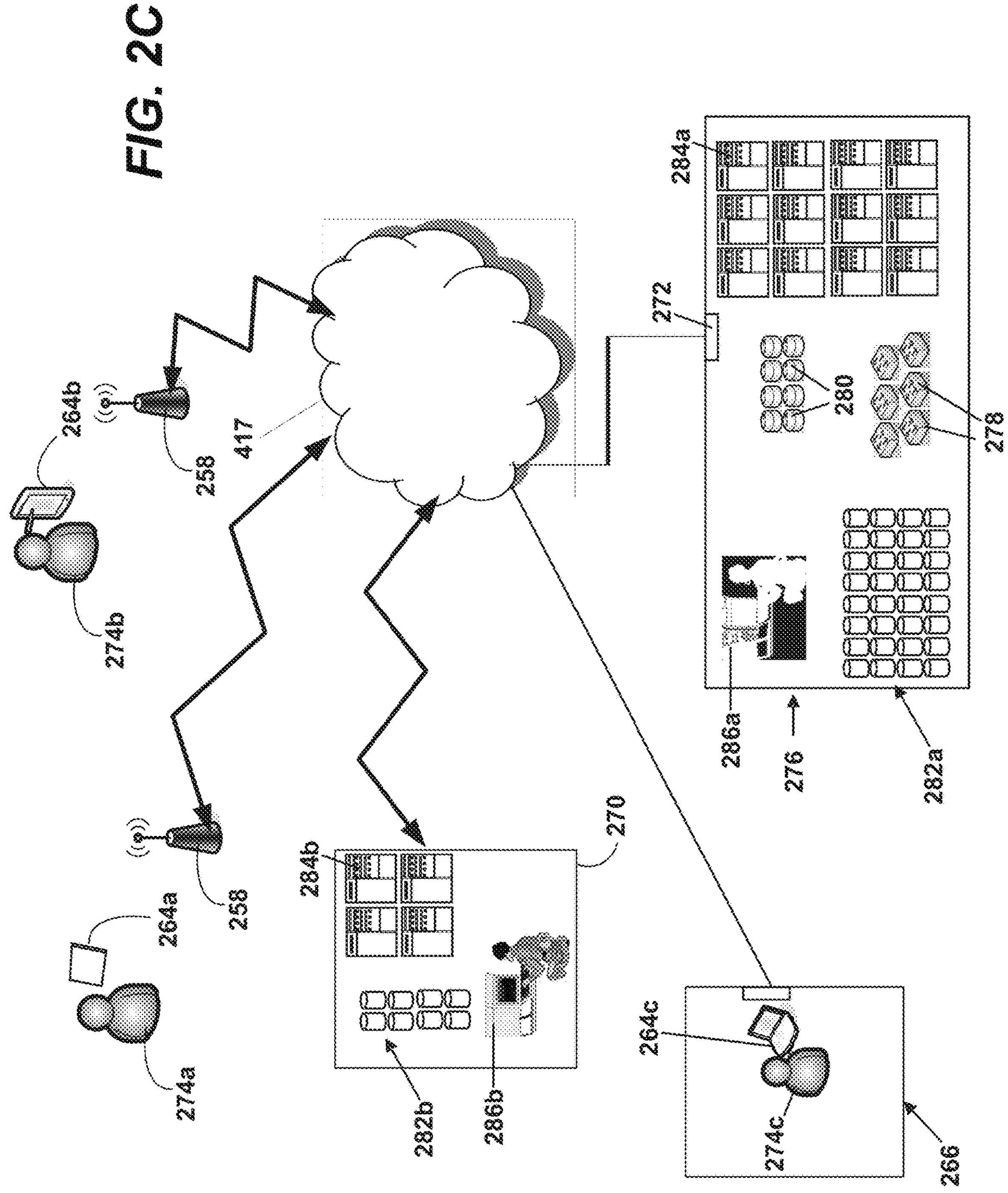
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which game credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Example Game Processing Architecture

Figure 3:
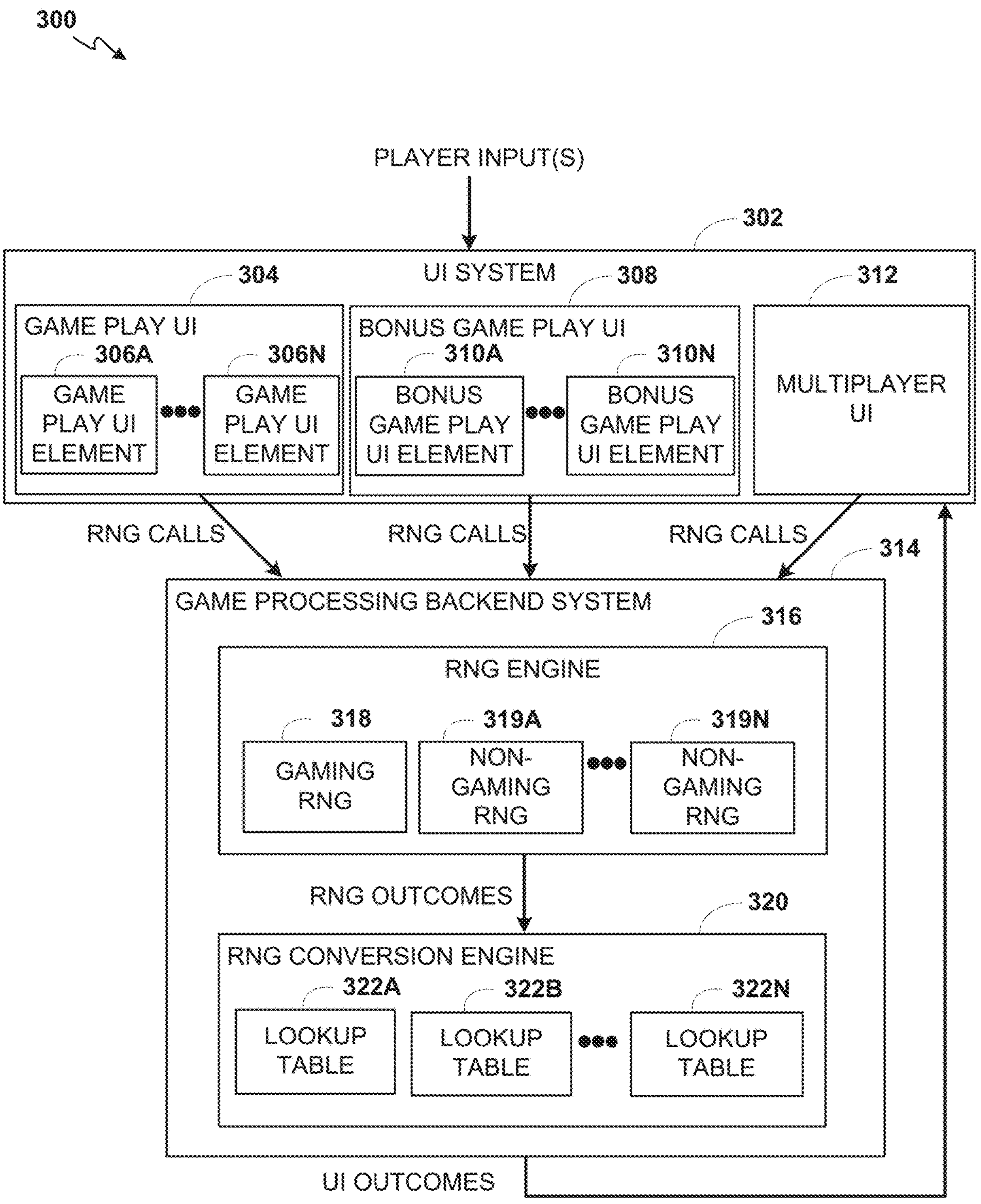
FIG. 3 illustrates, in block diagram form, an implementation of a game processing architecture that implements a game processing pipeline for the play of a game in accordance with various implementations described herein.

FIG. 3 illustrates, in block diagram form, an implementation of a game processing architecture that implements a game processing pipeline 300 for the play of a game in accordance with various implementations described herein. As shown in FIG. 3, the gaming processing pipeline 300 starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes, for example random numbers. The RNG outcomes are then sent to the RNG conversion engine 320 to generate one or more game outcomes for the UI system 302 to display to a player. A gaming device, such as gaming devices 104A-104X and 200 shown in FIGS. 1 and 2A, respectively, can implement the game processing pipeline 300. Alternatively, portions of the game processing pipeline 300 can be implemented using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels in a reel area) are shown and/or made available to a user. In a subsequent game instance, the UI system 302 could transition out of the base game to one or more bonus game features. The bonus game play UI 308 represents a UI that utilizes bonus game play UI elements 310A-310N for a player to interact with and/or view during a bonus game feature. In one or more implementations, at least some of the game play UI element 306A-306N are similar to the bonus game play UI elements 310A-310N. In other implementations, the game play UI element 306A-306N can differ from the bonus game play UI elements 310A-310N.

In one or more implementations, the game processing pipeline 300 can incorporate the example implementations described herein into various types of reel games. In particular, a reel game includes a base reel game shown with game play UI 304 or bonus reel game shown with bonus game play UI 308. Generally, a base, or primary, reel game includes play that involves spinning reels. A bonus reel game can add the possibility of winning a relatively large payout. A bonus reel game may require an additional wager, but typically does not. For purposes of this disclosure, a bonus reel game can be a type of supplemental game feature the game processing pipeline 300 can implement.

For a reel game, the game play UI 304 and/or bonus game play UI 308 includes a reel area that encloses viewable portions of a set of reels associated with the reel area. For each reel strip, the viewable portion of the reel strips includes one or more positions for symbols. Thus, the reel area is a matrix of symbols on a UI and may be highlighted to emphasize reel strips and symbols within the reel area. The number of reel strips and dimensions of the reel area depend on implementation. In some typical configurations, a reel area has an m×n configuration, with m reels and with n symbols visible per reel. For example, for a base reel game, a reel area can have a 5×3 configuration—five reels per window, with three symbols showing in the window for each of the reels. More generally, the reel area spans m reels in a first dimension and spans n symbols in a second dimension orthogonal to the first dimension, where the value of m can be 4, 5, 6, 7, 8, or some other number of reels, and the value of n can be 2, 3, 4, 5, 6, or some other number of symbols. Typically, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels. Alternatively, a reel area can have another configuration. For example, a reel area can have different numbers of symbols visible for different reels (e.g., going left to right in a reel area, two symbols visible for a leftmost reel, three symbols visible for a second reel, four symbols visible for a center reel, three symbols visible for a fourth reel, and two symbols visible for a rightmost reel), or as further explained below, a reel area can have a p×q configuration, with p×q reels visible in a rectangular reel area, and a single symbol visible per reel.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. As an example, in a reel game, to determine the game outcome, the RNG conversion engine 320 includes reel strips that vary in symbol pattern and reel strip length. Each reel strip includes x positions along a one-dimensional strip of symbols, where x depends on implementation. For example, x is 30, 80, 100, 200, or some other number of positions. The value of x can be the same or different for different reels (thus, different reels can have different numbers of positions). Each reel can have a data structure (e.g., array, linked list) that tracks the symbols at the respective positions of the reel strip for the reel. In some example implementations, the configuration of the symbols at the positions of the reel strips for the reels of a reel game is fixed after the reel game boots, although limited reconfiguration operations may be permitted. In other example implementations, the configuration of the symbols at the positions of the reel strips for the reels of a reel game can change dynamically after the reel game boots (e.g., depending on bet level or some other factor). Different sets of reels can be used for a base reel game and bonus reel game (or other supplemental game feature such as a special mode of the base reel game). For example, for a special mode of a base reel game, more "valuable" symbols or target symbols, such as wild symbols or scatter symbols, can be added to the reels of a base reel game or swapped in for other symbols on the reels.

RNG conversion engine 320 could also utilizes one or more lookup tables 322A-322N, which are also called weighted tables, to regulate a prize payout amount for each RNG outcome and how often the gaming device pays out the derived prize payout amounts. To do so, RNG conversion engine 320 can determine various game outcomes and perform operations for various types of base game features and/or supplemental game features (e.g., a bonus game feature). Although not shown in FIG. 3, the RNG conversion engine 320 could store and/or utilize one or more sets of reel strips, where each set of reel strips has different reel strip patterns. The RNG conversion engine 320 can also store (e.g., as data structures) and/or utilize one or more lookup tables 322 to assign probabilities to different options. For example, the RNG conversion engine 320 selects one of the different options based on a random number for the RNG outcome, where the different options are represented in different entries of a lookup table 322.

In one or more implementations, for a given lookup table 322, the probabilities for different options can be reflected in table entry values (e.g., for a random number RND associated with a RNG outcome, generated by an RNG, in the range of 0<RND<=40 for option 1, 40<RND<=70 for option 2, 70<RND<=90 for option 3, and 90<RND<=100 for option 4, given four options and a random number RND where 0<RND<=100). The table entry values can represent percentages or, more generally, sub-ranges within the range for a random number. In some implementations, the table entry values for a lookup table 322 are represented as count values (which can also be referend throughout the disclosure as "weights") for the respective entries of the lookup table. As an example, the following table shows count values for the four options described above:

TABLE 1

Example Lookup Table

| count value | entry |
|---|---|
| 40 | <value a1, value a2, . . .> |
| 30 | <value b1, value b2, . . .> |
| 20 | <value c1, value c2, . . .> |
| 10 | <value d1, value d2, . . .> |

The sum total of the count values indicates the range of the options. The game processing backend system 314 can use a random number for an RNG outcome, generated between 1 and the sum total of the count values, to select one of the entries in the lookup table 322 by comparing the random number to successive running totals. In the example shown in Table 1, if the random number for the RNG outcome is 40 or less, the RNG conversion engine 320 selects the first entry. Otherwise, if the random number for the RNG outcome is between 41 and 70, RNG conversion engine 320 selects the second entry. Otherwise, if the random number for the RNG outcome is between 71 and 90, the RNG conversion engine 320 selects the third entry. Otherwise, the RNG conversion engine 320 selects the last entry. The table entry values for a lookup table 322 can be fixed and predetermined, can vary dynamically (e.g., depending on bet level), or can be dynamically selected (e.g., depending on bet level, depending on another factor) from among multiple available lookup tables. Different game parameters or choices during game play can use different lookup tables 322, or different combinations of game parameters or choices can be combined in entries of a given lookup table 322.

In general, after the reel strips have landed to produce a random based game outcome (also referenced throughout the disclosure as "reel stops"), the game processing backend system 314 identifies any win conditions and any win amounts to award to the player (e.g., credited to the player's credit balance). In some examples, win conditions depend on a count of credit symbols that land after the reel stops. In other examples, win conditions are defined as paylines (also called win lines) across at least a portion of a reel area on a display screen. For a round of play, game processing backend system 314 awards a win amount when a certain combination of symbols appears along a payline. Win amounts can vary according to the combination of symbols and according to the particular payline along which the combination of symbols land. In one or more implementations, instead of evaluating win conditions on paylines across reels, the game processing backend system 314 can determine an award according to a "ways" approach. The game processing backend system 314 typically determines the win amounts according to a pay table, where the pay table comprehends the various combinations of symbols and/or paylines that may occur (e.g., the win conditions). The win amount for a round of play may be a fraction of an amount wagered for that round of play for certain win conditions. For other win conditions, the win amount may be much larger than the amount wagered.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game feature, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline 300.

Linking a Designated Game Attribute Across Games in a Multi-Game Package

A multi-game package loaded on a gaming device is configured to present and implement multiple games for the gaming device. Rather than programming each game of the multi-game package to be self-contained and isolated from other games, the multi-game package is set up to share and/or link one or more designated game attributes, such as game specific jackpots or other game prizes, across multiples games. For purpose of this disclosure, the term "game specific jackpot" refers to a prize and/or payout that a gaming device (e.g., EGM or game server) triggers and distributes based on rounds of play in one or more eligible, designated game. In other words, the gaming device is unable to trigger a game specific jackpot designated for one or more games when the gaming device initiates and executes game instances in an ineligible, non-designated game. For example, a multi-game package could include games A and B, where game specific jackpot A is designated to be triggerable in game A and game specific jackpot B is designated to be triggerable in game B. When the gaming device executes game A, the gaming device is eligible to trigger game specific jackpot A, but is ineligible and unable to trigger game specific jackpot B. To trigger game specific jackpot B, the gaming device would need to exit game A and enter and execute game instances in game B to become eligible.

Examples of game specific jackpots include progressive jackpots (e.g., stand-alone progressive (SAP) jackpots), mystery jackpots, and must-hit-by jackpots. Within this disclosure, an "SAP jackpot" refers to a prize and/or payout that adjusts (e.g., increments or decrements) based on wagers placed on a specific gaming device. In a multi-game package context, one or more games in the multi-game package context could be linked to a given SAP jackpot.

SAP jackpots differ from other types of progressive jackpots, such as local progressive or wide area network progressives, in that wagers on other gaming devices are not pooled or linked together to form and contribute to the progressive jackpot. For purpose of this disclosure, the term "prize" is not limited to cash awards or awards in the form of hard currencies (e.g., United States dollar, Australian dollar, Macau pataca), but can also include other types of awards, such as loyalty program awards, vouchers for promotional credits, entertainment, and/or eateries, other marketing-based awards, game-based or virtual awards (e.g., loot boxes and online virtual credits), and digital currencies-based awards (e.g., Bitcoin, Ether, etc.).

In one or more implementations, to link a game attribute across multiple games in a multi-game package, a gaming device can simultaneously fund multiple game specific jackpots linked to multiple games. Specifically, a gaming device funds a set of game specific jackpots each time the gaming device initiates a round play in a given game. In certain implementations, the gaming device does not fund one or more local jackpots that the gaming device can trigger in the given game. Continuing with the same example in the previous paragraph, game A includes multiple jackpots, such as game specific jackpot A, mini jackpot A, and minor jackpot A, and game B includes multiple jackpots, such as game specific jackpot B, mini jackpot B, and minor jackpot B. If a gaming device executes game instances in game A, the gaming device simultaneously funds game specific jackpots A and B, but does not fund local jackpots, mini jackpots A and B and minor jackpots A and B. In one example, rather than being a progressive type jackpot, the prize or payout amount of mini jackpots A and B and minor jackpots A and B do not grow and can bet set according to a player's bet value, denomination value, bet multiplier value, and/or other game parameters. Although the gaming device funds game specific jackpot B when executing game instances in game A, the gaming device would be ineligible to trigger a distribution or payout of game specific jackpot B since the jackpot is designated for game B, not game A.

Having the gaming device simultaneously fund multiple game specific jackpots across multiple games provide technical improvements to the gaming device. Specifically, by simultaneously funding multiple game specific jackpot, the gaming device performs a new and/or improved function that allows a gaming device to enforce a policy where certain games are eligible to trigger certain game specific jackpots while concurrently building game equity across multiple games. A gaming device can later access other games to become eligible for obtaining the game equity built in the other games. By doing so, the gaming device can comply with certain gaming regulations and prevent having only a subset of the games in the multi-game package to be played. In one example, a multi-game package could be configured to fund a major jackpot A for game A when game instances execute in game A. In this example, when executing game instances in game A, the gaming device would not fund other major jackpots, such major jackpots B and C, that are designated for other games B and C, respectively. By doing so, unless rounds of play occur in games B and C, major jackpots for B and C could remain relatively low or at their initial values causing game A to be played majority of the time. Conversely, if the multi-game package is configured to concurrently fund major jackpots A, B, and C when gaming device executes game instances in game A, then major jackpots B and C continue to grow and do not stay stagnant even when the gamine device does not execute game instances in games B and C. Having game equity that simultaneously accumulates for all three games could cause players to select the other games B and C for game play even after a game device triggers a payout of major jackpot A in game A. For purpose of this disclosure, the term "game equity" generally refers to a potential or perceived value that accumulates as rounds of play progress.

For a multi-game package, the gaming device can simultaneously fund multiple game specific jackpots across multiple games using a predetermined or random funding rate. In one implementation, to implement a predetermined funding rate, the gaming device can contribute a fixed percentage of the wager for a given round of play to each game specific jackpot. The fixed funding rate may not change from each round of play in a game and/or when switching from one game to another game. In another implementation, the gaming device could randomly contribute varying amounts to the game specific jackpots based on one or more game parameters, such as spin count, current prize value of a given game specific jackpot, and/or jackpot metamorphic states. Stated another way, the funding rate could dynamically or randomly change by monitoring and/or accounting for at least one game parameter. In both examples, to comply with gaming regulations, the gaming device would still need to be configured to generate a target or controllable RTP for each game specific jackpot. Other implementations could also provide fixed or random funding rates after completing a certain number of rounds of play. For example, instead of contributing to multiple game specific jackpots for each initiated round of play, the gaming device could wait and contribute to the multiple game specific jackpots every two, three, or four rounds of play.

With reference to FIG. 3, to share and/or link one or more designated game attributes (e.g., game specific jackpots) across multiples games, the UI system 302 could present a lobby that allows a player to select a game from a set of games included in the multi-game package. As part of the lobby, the UI system 302 could present one or more designated game attributes that are linked across multiple games but are eligible to be triggered in a subset of the games. After a player selects a game, the UI system 302 presents the game play UI 304 to the player. Within the game play UI 304, the player could use the gaming device to set a wagering amount and initiate a round of play; thereby, causing the game play UI 304 to present to a player one or more random based game outcomes. In a slot game context, a round of play corresponds to spinning one or more sets of reels within one or more game play windows. The game play UI 304 would also present to a player changes in the designated game attributes when initiating and/or completing a round of play. For example, using game specific jackpots as the designated game attributes, the game play UI 304 would present a simultaneous incrementation of multiple game specific jackpots after a player presses a spin button on a gaming device.

In one or more implementations, to increment the value of the game specific jackpots while controlling RTP for each game specific jackpot, the game processing pipeline 300 can utilize the game processing backend system 314 to implement a predetermined funding rate. In one example, to implement a predetermined funding rate, the game processing backend system 314 could use a fixed funding rate, such as 0.05% of a player's wager that stays stagnant or does not change through all rounds of play and/or between the linked games. The game processing backend system 314 could store the fixed funding rate as a static global variable accessible across multiple games. In other words, having the fixed funding rate as a static global variable allows the game processing backend system 314 to share and utilize the funding rate for multiple games.

In another example, to implement a predetermined funding rate, a game processing backend system 314 can implement a tiered, fixed funding rate that changes based on one or more game parameters. Table 2 provides an example lookup table 322 for determining the tiered, fixed funding rate based on the current prize value of a game specific jackpot. Using Table 2 as an example, the game processing backend system 314 sets the predetermined funding rate at relatively higher fixed funding rate (e.g., 0.10%) when the current prize value of the game specific jackpot is within a relatively low value range (e.g., $500-$550). As the current prize value of the game specific jackpot increases, the fixed funding rate drops to a predetermined, lower fixed funding rate. In Table 2, when the current prize value of game specific jackpot is within a relatively high value range (e.g., $951-$1000), the game processing backend system 314 sets the predetermined funding rate to a relatively low fixed funding rate (e.g., 0.02%).

TABLE 2

| Example Tiered, Fixed Funding Rate | |
|---|---|
| Fixed Funding Rate | Game Specific Jackpot Value Ranges |
| 0.10% | $500-$550 |
| 0.08% | $551-$650 |
| 0.05% | $651-$850 |
| 0.03% | $851-$950 |
| 0.02% | $951-$1000 |

By scaling the funding rate according to the current prize value of a game specific jackpot, the value and/or game equity for the game specific jackpot can be built up relatively quick at the beginning to promote balanced game play amongst the games in a multi-game package. Moreover, using a predetermined scale for determining the funding rate allows the game processing backend system 314 to control the RTP of the game specific jackpots. Other implementations could use other game parameters to promote the balance of game play amongst the games in the multi-game pack, such as the number of accumulated spins since awarding the game specific jackpot, number of spins accumulated for a given game over a specific time period, and/or current state of a corresponding jackpot metamorphic. The game processing backend system 314 could store the tiered, fixed funding rate as a lookup table 322 that can be utilized by multiple games.

The game processing backend system 314 could support other implementations for funding the game specific jackpots. In one or more implementations, the game processing backend system 314 can randomly determine the funding rate based on one or more game parameters (e.g., spin count, current prize value of a game specific jackpot, and/or jackpot metamorphic states.). Referring to FIG. 3 as an example, to randomly determine the funding rate based on the current prize value of a game specific jackpot, the game processing pipeline 300 initiates an RNG call to the game processing backend system 314. The gaming RNG 318 generates an RNG outcome that the RNG conversion engine 320 utilizes to perform a lookup on one or more lookup tables 322. In one example, each lookup table 322 corresponds to different prize value ranges of game specific jackpots. The RNG conversion engine 320 could have a lookup table 322 to determine the funding rate when game specific jackpots are within a prize value range of $500-550, a separate lookup table 322 for when the game specific jackpots are within a prize value range of $551-$650, another lookup table 322 for when the game specific jackpots are within a value range of $651-850, and so forth. In another example, the game processing pipeline 300 utilizes a single lookup table 322 that maps all prize value ranges of the game specific jackpot to one or more funding rates.

Tables 3 and 4, which are shown below, provide examples of some of the lookup tables 322 that game processing backend system 314 could use to randomly determine the funding rate. Specifically, Tables 3 and 4 are associated with a specific value range for the game specific jackpots. Table 3 is a lookup table 322 that maps the RNG outcome to a range of funding rates when the current prize value of the game specific jackpot is between $500-$550. Table 4 is a lookup table 322 that maps the RNG outcome to a range of funding rates when the current prize value of the game specific jackpot is between $551-$650. The game processing backend system 314 could use other lookup tables (not shown below) to map the RNG outcome to funding rates when the game specific jackpots are within other prize value ranges.

TABLE 3

| Example Lookup Table for a Current Prize Value within $500-$550 | |
|---|---|
| Count Value | Funding Rate |
| 20 | 0.09% |
| 15 | 0.10% |
| 10 | 0.11% |
| 5 | 0.12% |

TABLE 4

| Example Lookup Table for a Current Prize Value within $551-$650 | |
|---|---|
| Count Value | Funding Rate |
| 20 | 0.07% |
| 15 | 0.08% |
| 10 | 0.09% |
| 5 | 0.10% |

The different ranges of funding rates between Tables 3 and 4 are based on building up game equity relatively quickly at the beginning in attempt to balance game play amongst the games in a multi-game package. To maintain a target game RTP, Tables 3 and 4 illustrate that the funding rate ranges drops as the current prize value of the game specific jackpot increases into a relatively higher value range. Specifically, Table 3 has a funding rate range of 0.09% to 0.12% while Table 4 has a funding rate range of 0.07% to 0.10%. The game processing backend system 314 also attempts to maintain the target game RTP by weighting Tables 3 and 4 to more likely return lower funding rates than higher funding rates. The game processing backend system 314 could utilize similar lookup tables 322 for other game parameters, such as spin count and/or metamorphic states, when randomly determining the funding rates.

Figure 4:
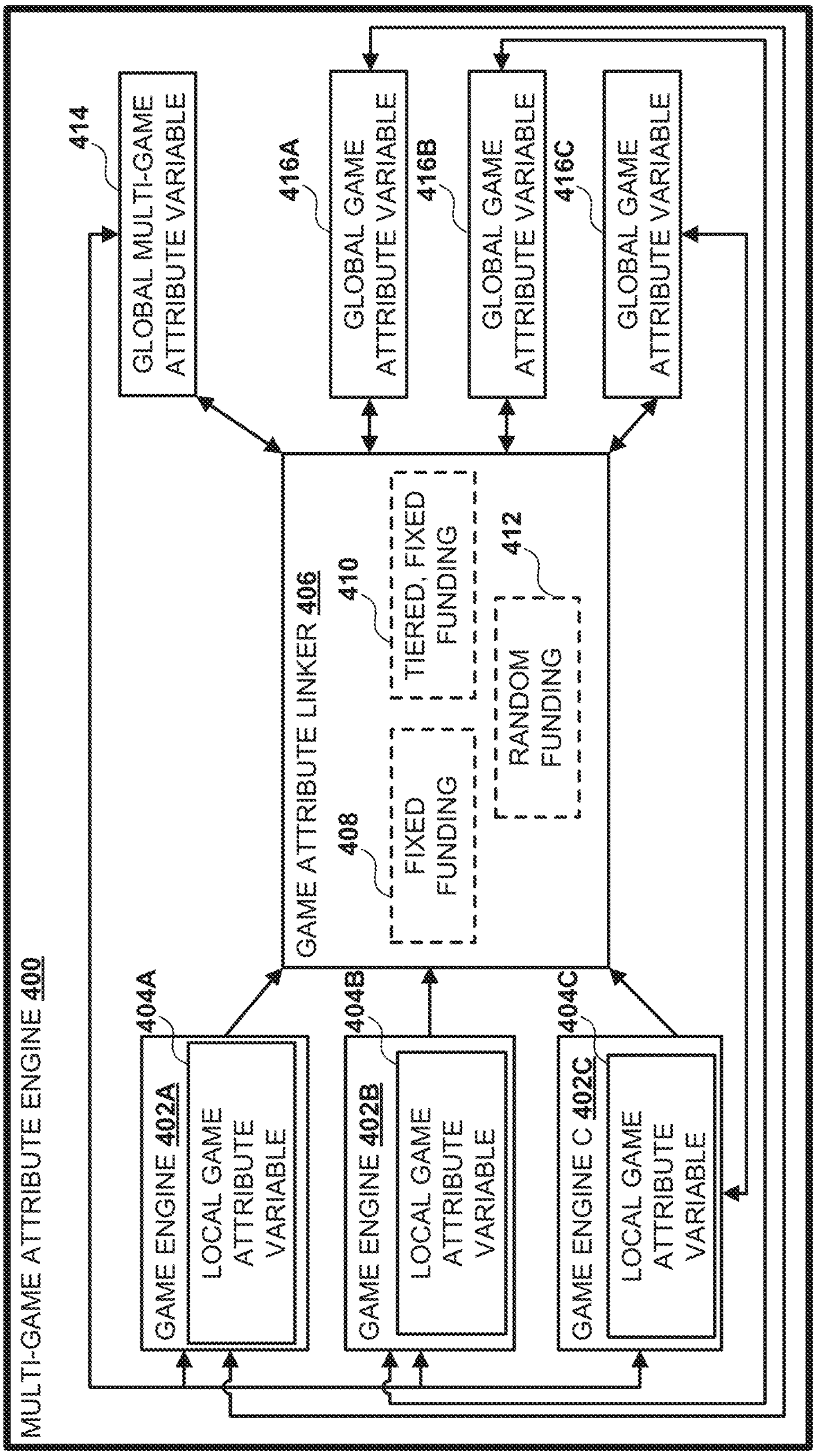
FIG. 4 is a block diagram of an implementation of a multi-game attribute engine for linking one or more game attributes across multiple games.

FIG. 4 is a game logic block diagram of an implementation of a multi-game attribute engine 400 that links one or more game attributes across multiple games combined into a multi-game package. The use and discussion of FIG. 4 is for exemplary purposes and is not intended to limit the disclosure to the specific game logic implementation. Game controller 202 and/or progressive system server 112 shown in FIG. 2A, and/or game processing backend system 314 shown in FIG. 3, could implement one or more portions of the multi-game attribute engine 400 by executing code for a multi-game package. As shown in FIG. 4, the multi-game attribute engine 400 includes three separate and distinct game engines 402A, 402B, and 402C, which are also generally referred to as game engine 402 throughout this disclosure. When executed, a game engine 402 generates multiple game instances for a given game. Using FIG. 4 as an example, game engine 402A executes to implement rounds of play in a game A; game engine 402B executes to implement rounds of play in a game B; and game engine 402C executes to implement rounds of play in a game C.

For purposes of this disclosure, the term "game" refers to a gaming application or otherwise executable code that when executed on a gaming device generates a form of play (whether single player or multi-player mode) based on random outcomes that is played according to a set of rules. In one or more implementations, a game can also be configured to achieve a target game RTP. As an example, in a typical Class III slot game context, a "game" generally includes a base game that triggers one or more supplemental game features and/or secondary features. The base game and the supplemental game features and/or secondary features combined provide a disclosed target game RTP (e.g., a target game RTP of 92%). Referring to FIG. 4, game A generated from game engine 402A would have its own game rules and target game RTP that is separate and independent from games B and C generated from game engine 402B and 402C, respectively. In one or more gaming jurisdictions, each game A, B, and C would need to be submitted for review and verified that the game complies with gaming regulations. In a multi-game package context, a gaming device would present rounds of play for a given game one at a time by executing the respective game engine 402. For example, if a gaming device is executing game engine 402A to implement game A, the gaming device would need to exit out of game A and switch over to game engine 402B to implement game B.

In FIG. 4, each game engine 402A, 402B, and 402C manages local game attribute variables 404A, 404B, and 404C, which can also be generally referenced as local game attribute variables 404 in this disclosure. Local game attribute variables 404 represent data (e.g., a current prize value) for a local game attribute (e.g., a minor jackpot) in a specific game. A local game attribute corresponds to a game attribute that can be modified, triggered, and/or reset within the specific game or game engine 402 and is isolated from other games or game engines 402. As an example, local game attribute variable 404A could store the current prize value of a local jackpot, such as a mini or minor jackpot. Game engine 402A can adjust the current prize value of the local jackpot and/or trigger the local jackpot based on one or more game parameters associated with game A and/or rounds of play that occur in game A. Other game engines 402B and 402C are unaware, unable, and/or ineligible to access, modify, increment, and/or trigger the local jackpot. In other words, local game attribute variables 404A, 404B, and 404C are self-contained within their corresponding game engines 402A, 402B, and 402C and are not linked or affected by rounds of play generated by other game engines 402.

FIG. 4 illustrates that game engines 402A, 402B, and 402C are linked to game attribute linker 406 to pass or provide data to the game attribute linker 406. The game attribute linker 406 uses the data it receives from game engines 402A, 402B, and 402C to modify and update global game attribute variables 416A, 416B, and 416C, and/or global multi-game attribute variable 414. As shown in FIG. 4, the game attribute linker 406 is setup to update the global game attribute variables 416A, 416B, and 416C, and global multi-game attribute variable 414 according to one or more determined funding rates. The game attribute linker 406 could include a fixed funding module 408, a tiered, fixed funding module 410, and/or a random funding module 412 to determine the funding rates. The fixed funding module 408 could store and/or use a static funding rate, such as 0.05% of a player's wager, that stays stagnant or does not change through all rounds of play and/or for one or more linked games. The tiered, fixed funding module 410 could store and/or use a tiered, fixed funding rate that changes based on one or more game parameters. Table 2, which was previously disclosed, provides an example lookup table the game attribute linker 406 could store and use to determine a tiered, fixed funding rate. The random funding module 412 randomly determines the funding rate based on one or more game parameters. Tables 4 and 5, which were previously disclosed, provide examples of lookup tables the game attribute linker 406 could store and/or use to randomly determine the funding rate. The fixed funding module 408, tiered, fixed funding module 410, and random funding module 412 are shown in dotted boxes to depict that these modules are optional and are not necessarily included in all implementations of the multi-game attribute engine 400. In one or more implementations, the game attribute linker 406 could perform other operations not shown in FIG. 4 besides determining and applying a funding rate, such as determining and modifying the states of the global game attribute variables 416A, 416B, and 416C and/or global multi-game attribute variable 414.

Global game attribute variables 416A, 416B, and 416C (also generally referenced as global game attribute variables 416 throughout this disclosure) corresponds to a game attribute that can be linked across multiple games or game engines 402. Although global game attribute variables 416A, 416B, and 416C are linked across multiple games, certain functionality associated with the corresponding game attribute, such as triggering and/or resetting the game attribute, are reserved and eligible for a specific game or game engine 402. Other games or game engines 402 are ineligible and unable to access (e.g., trigger and/or reset) the reserved functions. As an example, global game attribute variables 416A, 416B, and 416C could store the current prize value of three different game specific jackpots. No matter what game engine 402 executes rounds of play, the game attribute linker 406 updates all three global game attribute variables 416A, 416B, and 416C; thereby, linking the three global game attribute variables 416A, 416B, and 416C across three game engines 402A, 402B, and 402C. However, to reset the value of each global game attribute variables 416A, 416B, and 416C, a specific game engine 402 is eligible for triggering the game attribute. This game specific eligibility is shown in FIG. 4 by depicting a connection link between each global game attribute variables 416A, 416B, and 416C and a specific game engine 402A, 402B, and 402C. Specifically, global game attribute variable 416A is linked to game engine 402A; global game attribute variable 416B is linked to game engine 402B; and global game attribute variable 416C is linked to game engine 402C. Based on these links, game engine 402A is eligible to trigger the reset of global game attribute variable 416A, game engine 402B is eligible to trigger the reset of global game attribute variable 416B, and game engine 402C is eligible to trigger the reset of global game attribute variable 416C.

Global multi-game attribute variable 414 corresponds to another game attribute that can be linked across multiple games or game engines 402 without reserving functionality. As shown in FIG. 4, the global multi-game attribute variable 414 has connection links between all three game engines 402; thereby, indicating all three game engines 402 are eligible to trigger the game attribute associated with global multi-game attribute variable 414. Based on these connection links, the global multi-game attribute variable 414 differs from global game attribute variables 416A, 416B, and 416C in that the global multi-game attribute variable 414 does not reserve functionality that are accessible by certain game engines 402. For example, game engines 402A, 402B, and 402C can modify the global multi-game attribute variable 414 and trigger a reset of the global multi-game attribute variable 414. A wide area progressive jackpot that is eligible to be triggered by multiple games and/or gaming devices is an example of a game attribute associated with a global multi-game attribute variable.

Figure 5:
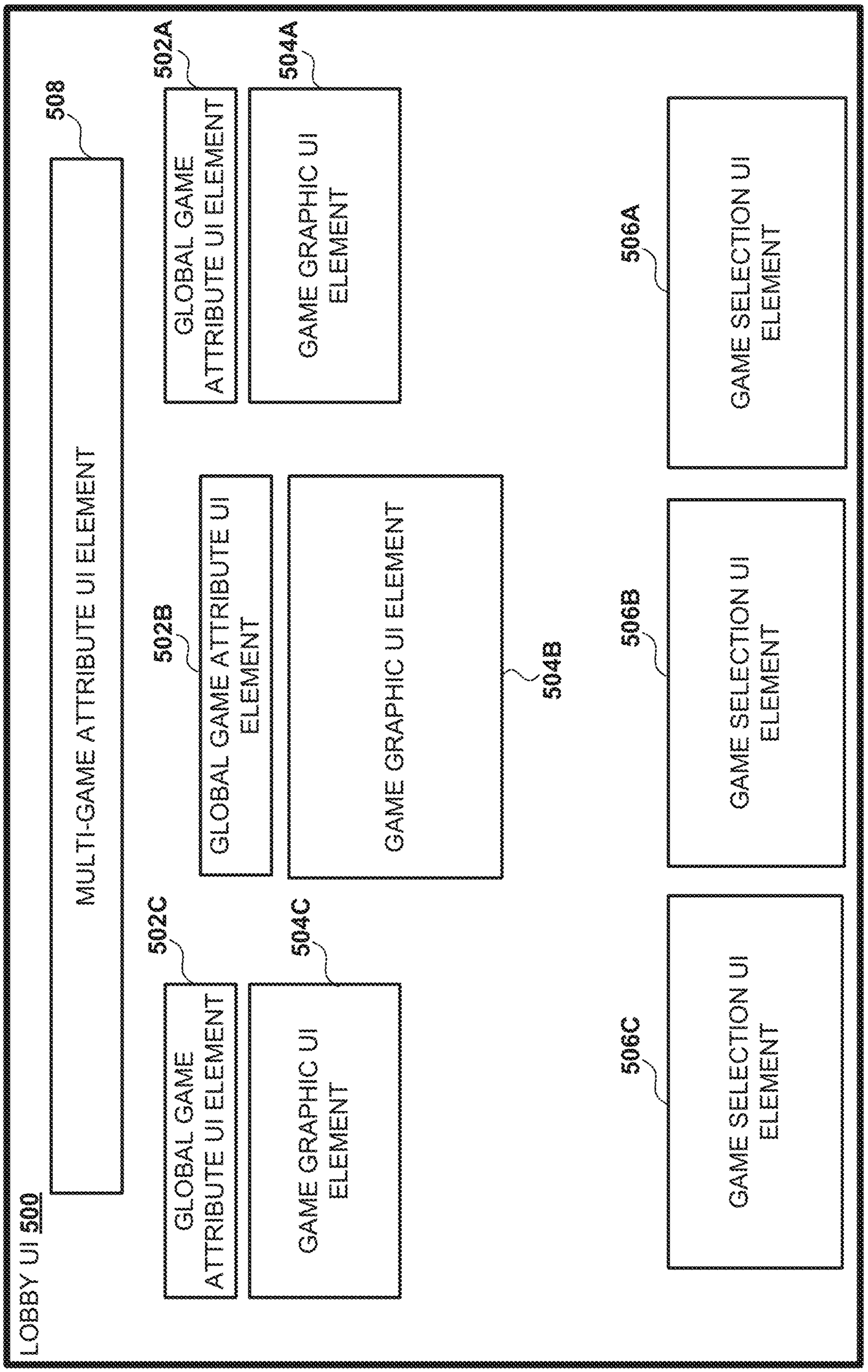
FIG. 5 is a diagram that depicts an example general layout of a lobby UI for a multi-game package.
Figure 19:
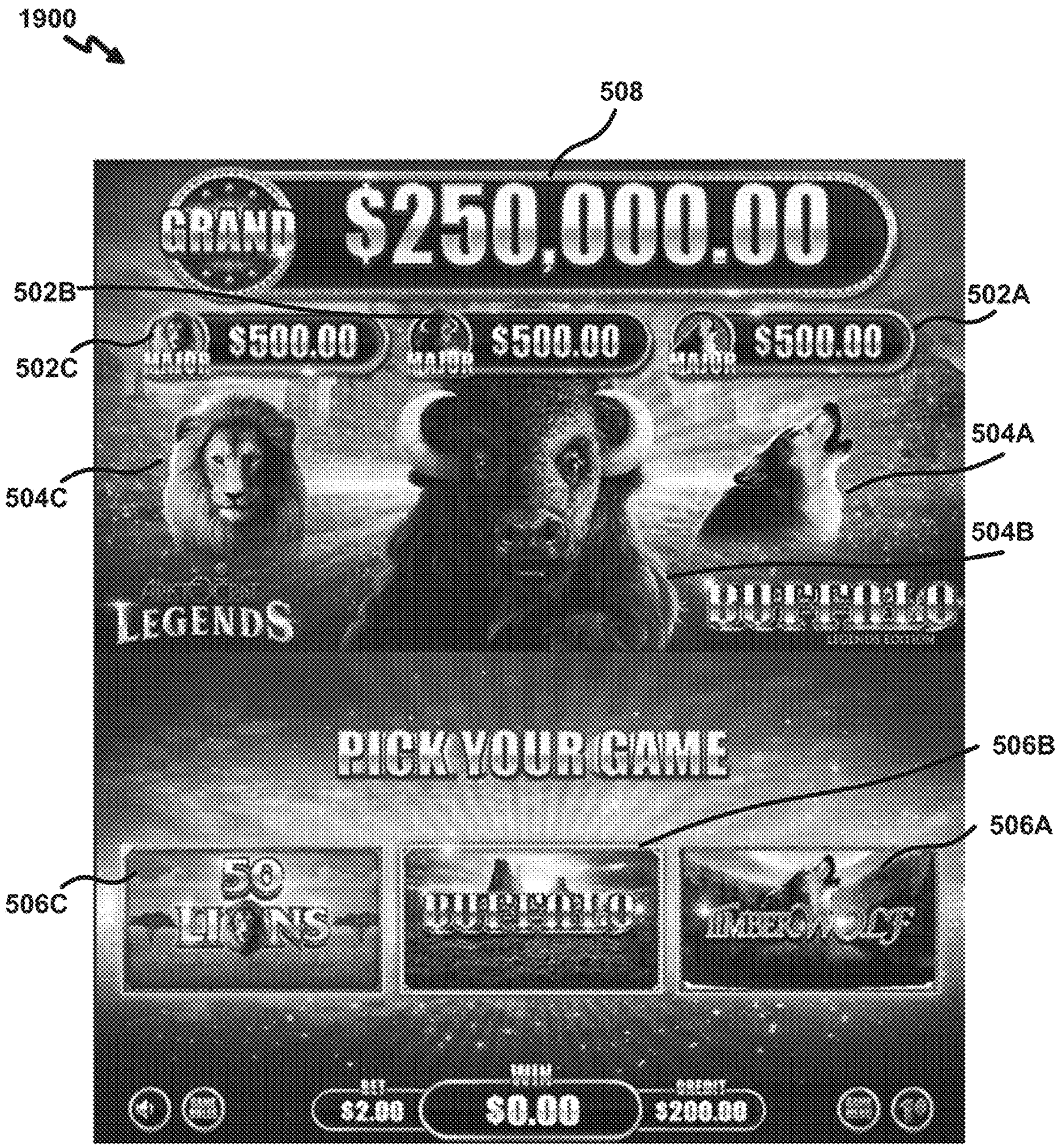
FIG. 19 is a diagram that depicts an example of themed version of a lobby UI.

FIG. 5 is a diagram that depicts an example general layout of a lobby UI 500 for a multi-game package. A gaming device can present lobby UI 500 shown in FIG. 5 when executing a game program. Using FIG. 2A as an example, when a gaming device 200 executes game program 206, the gaming device 200 displays the lobby UI 500 on primary game display 240 and/or secondary game display 242. Additionally, or alternatively, at least some or all portions of the lobby UI 500 could be presented on mechanical and/or electro-mechanical components not shown in FIG. 2A. The lobby UI 500 corresponds to a UI that a gaming device presents before entering one of the games, after exiting one of the games, and/or when the gaming device is idle and waiting for a player. FIG. 19 is an example screenshot of a themed version of a lobby UI 1900 based on the general layout depicted in lobby UI 500.

In FIG. 5, the lobby UI 500 includes global game attribute UI elements 502A, 502B, and 502C (also generally referenced as global game attribute UI elements 502) and game graphic UI elements 504A, 504B, and 504C (also generally referenced as game graphic UI element 504). Global game attribute UI element 502A and game graphic UI element 504A are associated with game A; global game attribute UI element 502B and game graphic UI element 504B are associated with game B; and global game attribute UI element 502C and game graphic UI element 504C are associated with game C. The global game attribute UI element 502 presents a game attribute and/or a current prize value of the global game attribute variable (e.g., global game attribute variable 416A shown in FIG. 4). In one or more implementations, the game attribute for the global game attribute UI element 502 is a game specific jackpot, where the global game attribute UI element 502 presents a current prize value of the game specific jackpot and/or a graphical game indicator associated with a specific game. Using FIG. 19 as an example, the global game attribute UI elements 502 each present a graphical indicator that includes a themed icon (e.g., lion, buffalo, or wolf icon), text indicating a major jackpot, and the current prize value of the major jackpot. The game graphic UI elements 504 presents a graphical indicator (e.g., a lion, buffalo, or wolf) associated with each game. Although FIG. 5 illustrates that each global game attribute UI element 502 designated to a specific game, other implementations could have at least one of the global game attribute UI elements 502 designated for more than one game. For example, each global game attribute UI element 502 could correspond to a game specific jackpot (e.g., an SAP jackpot) that has two or more eligible, designated games that can trigger the game specific jackpot.

Located above the global game attribute UI elements 502A, 502B, and 502C in the lobby UI 500 is the multi-game attribute UI element 508. With reference to FIG. 4, the multi-game attribute UI element 508 presents texts and/or graphics associated with global multi-game attribute variable 414. Using FIG. 19 as an example, the multi-game attribute UI element 508 presents texts that indicates the game attribute is associated with the global multi-game attribute variable 414 is a grand jackpot, and the grand jackpot has a current prize value of $250,000.

Located beneath the game graphic UI element 504 in the lobby UI 500 is the game selection UI elements 506A, 506B, and 506C (generally referenced as game UI selection element 506). In one or more implementations, lobby UI 500 can be shown on a touchscreen display. When a player touches the game selection UI element 506, the gaming device exits the lobby UI 500 and enters the game corresponding to the game selection UI element 506. In FIG. 5, game selection UI element 506A corresponds to a graphical indicator for game A; game selection UI element 506B corresponds to a graphical indicator for game B; and game selection UI element 506C corresponds to a graphical indicator for game C. In other implementations where lobby UI 500 is not implemented on a touchscreen display, lobby UI 500 can highlight one of the game selection UI elements 506 to indicate which game selection UI element 506 is currently being selected. In FIG. 19, game selection UI element 506 is shown beneath the "Pick Your Game" text.

Figure 6:
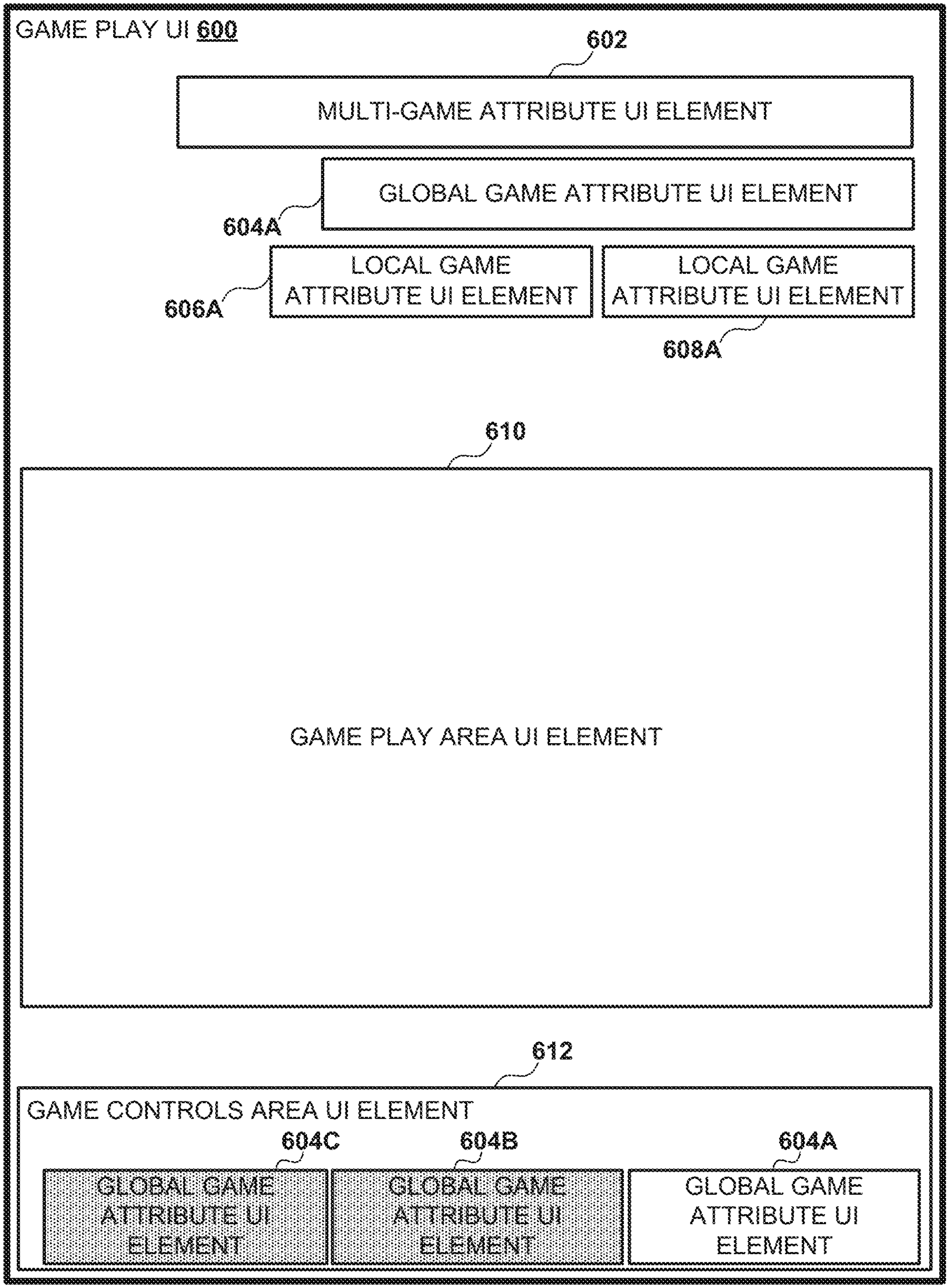
FIG. 6 is a diagram that depicts an example general layout of a game play UI after entering a specific game.

FIG. 6 is a diagram that depicts an example general layout of a game play UI 600 after entering a specific game. In particular, the game play UI 600 corresponds to a UI that a gaming device presents after a player makes a game a selection in the lobby UI 500 shown in FIG. 5. After entering the selected game, a gaming device can present the game play UI 600 when executing game instances for a given game. Using FIG. 4 as an example, when game engine 402A executes, a gaming device can present game play UI 600. With reference to FIG. 2A, game play UI 600 can be displayed on primary game display 240 and/or secondary game display 242. Additionally, or alternatively, at least some or all portions of the game play UI 600 could be presented on mechanical reels and/or other mechanical and/or electro-mechanical components not shown in FIG. 2A.

The game play area UI element 610 presents one or more random based game outcomes for one or more rounds of play within the selected game. To present random based game outcomes, the game play area UI element 610 could include one or more game play windows. In a slot game context, each game play window could present random based game outcomes in a base game, where some of the random based game outcomes can trigger one or more supplemental game features and/or secondary features. As an example, the random based game outcome in a game play window could trigger and enter a jackpot feature. During the jackpot feature, the gaming device can generate one or more random based game outcomes that cause the gaming device to trigger a game specific jackpot shown as global game attribute UI element 604A, a minor jackpot shown as local game attribute UI element 606A, a mini jackpot shown as local game attribute UI element 608A, and/or a grand jackpot shown as multi-game attribute UI element 602. In implementations where the game specific jackpot and the grand jackpot are progressive jackpots, the multi-game attribute UI element 602 or global game attribute UI element 604A may reset to an initial value after triggering a payout of the grand jackpot or major jackpot, respectively.

Figure 18:
FIG. 18 is a diagram that depicts an example of themed version of a game play UI after entering a specific game.

As shown in FIG. 6, the game play UI 600 also includes a global game attribute UI element 604A and local game attribute UI elements 606A and 608A. In one or more implementations, global game attribute UI element 604A and local game attribute UI elements 606A and 608A represent game attributes that are eligible to be triggered within a specific game (e.g., game A). Global game attribute UI element 604A appears visually similar to global game attribute UI element 502A shown in lobby UI 500 in FIG. 5 and/or presents the same or similar graphics and text associated with the global game attribute variable 416A shown in FIG. 4. Using FIGS. 18 and 19 as an example, the global game attribute UI element 502A and the global game attribute UI element 604A appear visually similar by presenting a wolf icon along with the text "Major" and a current prize value of the major jackpot. By having the global game attribute UI element 604A presents a current prize value of the major jackpot, the game play UI 600 presents a growth in game equity as the gaming device continues to execute game instances. The local game attribute UI elements 606A and 608A presents graphics and text associated with the local game attribute variable 404A. Recall that local game attribute variable 404A corresponds to a game attribute that can be modified, triggered, and/or reset within a specific game and is isolated from other games. With reference to FIG. 18, the minor jackpot and mini jackpot shown in game play UI 1800 represent the local game attribute UI elements 606A and 608A, respectively.

FIG. 6 also illustrates that game play UI 600 includes a game controls area UI element 612 that allows a player to start a round of play within the given game. For example, the game controls area UI element 612 could be located on a virtual button deck (VBD) that displays bet buttons and one or more spin buttons (not shown in FIG. 6). A player can select the bet buttons to set a wager amount for the round of play and select the spin button to initiate the round of play. In one or more implementations, the game controls area UI element 612 includes global game attribute UI elements 604A, 604B, and 604C. The global game attribute UI element 604A corresponds to a game attribute, such as a game specific jackpot, that is eligible to be triggered based on the rounds of play implemented in the selected game. The game controls area UI element 612 greys out the global game attribute UI elements 604A, 604B, and 604C based on the selected game. In FIG. 6, global game attribute UI element 604B and 604C are shown greyed out since these game attributes (e.g., game specific jackpots) are ineligible to be triggered with the rounds of play in the current game. The game controls area UI element 612 includes the global game attribute UI elements 604B and 604C to show how the prize values change (e.g., based on a funding rate) while progressing through the rounds of play in the selected game. Stated another way, the gaming device presents the increase in game equity for the other games while also presenting that the gaming device is unable and ineligible to trigger the game attributes associated with global game attribute UI elements 604B and 604C.

Figure 7:
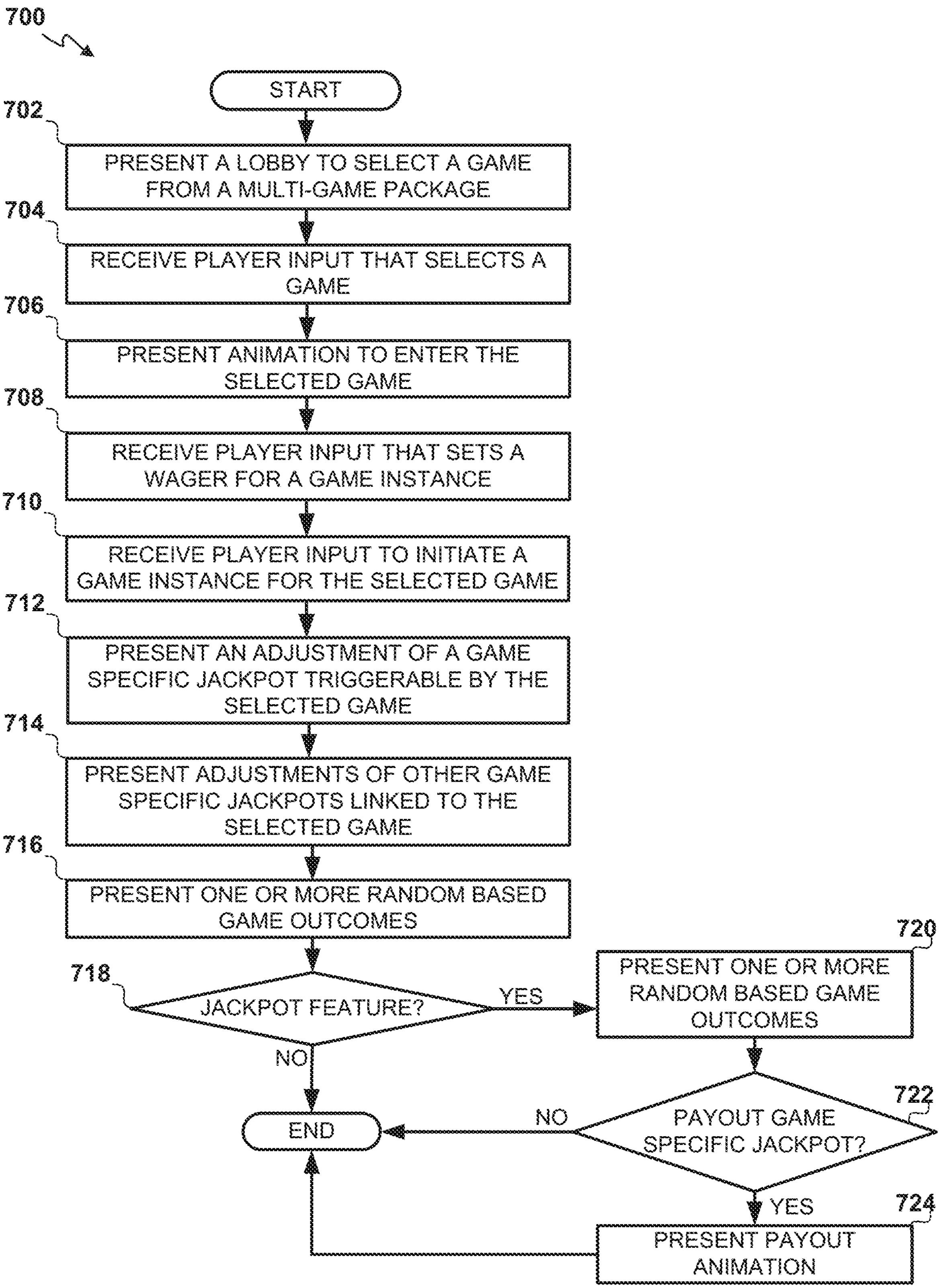
FIG. 7 depicts a flowchart illustrating a UI based operations for presenting game specific jackpots linked across multiple games.

FIG. 7 depicts a flowchart illustrating a UI based operations 700 for presenting game specific jackpots linked across multiple games. In one implementation, the UI based operation 700 may be implemented by a UI system 302 shown in FIG. 3 and/or displayed on the primary game display 240 and secondary game display 242 of a gaming device 200 shown in FIG. 2A. The UI based operation 700 also corresponds to the lobby UIs 500 and 1800 and game play UI 600 and 1900 shown in FIGS. 5, 6, 18, and 19. The use and discussion of FIG. 7 is only an example to facilitate explanation and is not intended to limit the disclosure to this specific example. For example, UI based operation 700 does not necessarily need to perform the sequence of blocks in the order as depicted in FIG. 7. Specifically, UI based operations 700 may implement block 718 before block 716. Additionally, or alternatively, one or more of the blocks may be optional and may not be performed in all implementations of UI based operation 700. As an example, blocks 718 and 722 may be optional and performed by a backend-based operation, such as backend-based operation 800 shown in FIG. 8. Although the UI based operations 700 is directed to game specific jackpots, the UI based operations 700 described in FIG. 7 can be utilized for other types of game attributes linked to multi-games.

UI based operation 700 may start at block 702 and present a lobby that allows a player to select a game from a multi-game package. Using FIG. 5 as an example, UI based operation 700 could present global game attribute UI elements 502 that correspond to game attributes linked across games in the multi-game package. In one example, the global game attribute UI elements 502 can include text and/or graphics to present game specific jackpots and current prize values associated with the game specific jackpots. At block 704, the UI based operation 700 receives player input that selects a game, such as making a game selection on a touch screen that displays the lobby or based on an input on a VBD. Referring to FIG. 5, a player can touch one of the game selection UI elements 506A, 506B, and 506C in the lobby UI 500.

After a player provides a player input to select a game, the UI based operation 700 moves to block 706 and presents an animation to enter the selected game. After entering the selected game, the UI based operation 700 receives a wager input that sets a wager for a game instance. The wager input could be set by pushing bet buttons displayed on a VBD. The UI based operation 700 may proceed to block 710 and receive player input to initiate a game instance for the selected game. For example, the player input can correspond to a player tapping a spin button to start the game instance.

At block 712, the UI based operation 700 can present an adjustment of a game specific jackpot triggerable by the selected game. Referring back to FIG. 6, the UI based operation 700 could increment the value displayed using the global game attribute UI element 604A in the game play UI 600. The amount of incrementation or adjustment of the game specific jackpot feature is based on a funding rate. Determining the funding rate was previously discussed with relation to FIGS. 3 and 4. At block 714, the UI based operation 700 also presents adjustment of other game specific jackpots linked to the selected game. Although the game specific jackpots are linked to the selected game, the gaming device is ineligible to trigger the other game specific jackpots. Using FIG. 6 as an example, the UI based operation 700 can present the other game specific jackpots as the greyed out global game attribute UI elements 604B and 604C. Greying out the global game attribute UI elements 604B and 604C can inform the player that the gaming device is unable to trigger the greyed out game specific jackpots. To avoid player confusion, the UI based operation 700 can present global game attribute UI elements 604B and 604C associated with other game specific jackpots outside the main display or view of the player, such as the VBD.

At block 716, the UI based operation 700 presents one or more random based game outcomes for the initiated game instance. The random based game outcomes could be for a slot game, keno, or other types of wagering game. Additionally, or alternatively, the random based game outcomes could be for single player games or multi-player games (e.g., tournaments). At block 718, the UI based operation 700 determines whether a jackpot feature is triggered. If a jackpot feature is triggered, then UI based operation 700 moves to block 720 and presents one or more random based game outcomes for the jackpot feature. Otherwise, UI based operation 700 ends.

After presenting one or more random based game outcomes, UI based operation 700 moves to block 720. At block 720, UI based operation 700 may determine whether to trigger a payout of the game specific jackpot based on the game outcomes for the jackpot feature. If the random based game outcomes trigger the game specific jackpot, then UI based operation 700 moves to block 724. If the random based game outcomes do not trigger the game specific jackpot, then UI based operation 700 ends. At block 724, UI based operation 700 presents a payout animation that may include resetting the game specific jackpot back to an initial value. The UI based operation 700 would not reset the values for the other game specific jackpots linked to the selected game.

The UI focused operations described above with reference to FIGS. 5, 6, 18, and 19 provide technical improvements relating to UI design. Specifically, the lobby UIs 500 and 1800 and game play UIs 600 and 1900 can improve the usability of the gaming devices, enhance a player's understandability of obtaining certain game outcomes, and provide a new and/or improved UI that presents how a player continuously builds game equity. For example, the lobby UIs 500 and 1800 and game play UIs 600 and 1900 present changes in a player's game equity across multiple games. The game equity continues to increase as round of plays in a selected game continues to progress. Other implementations of the lobby UIs 500 and 1800 and game play UIs 600 and 1900, may also alter the state of the metamorphic as game equity continues to increase. Stated another way, transitioning a metamorphic from one to state to another state could represent increases or decreases in a game's perceived or potential value.

Figure 8:
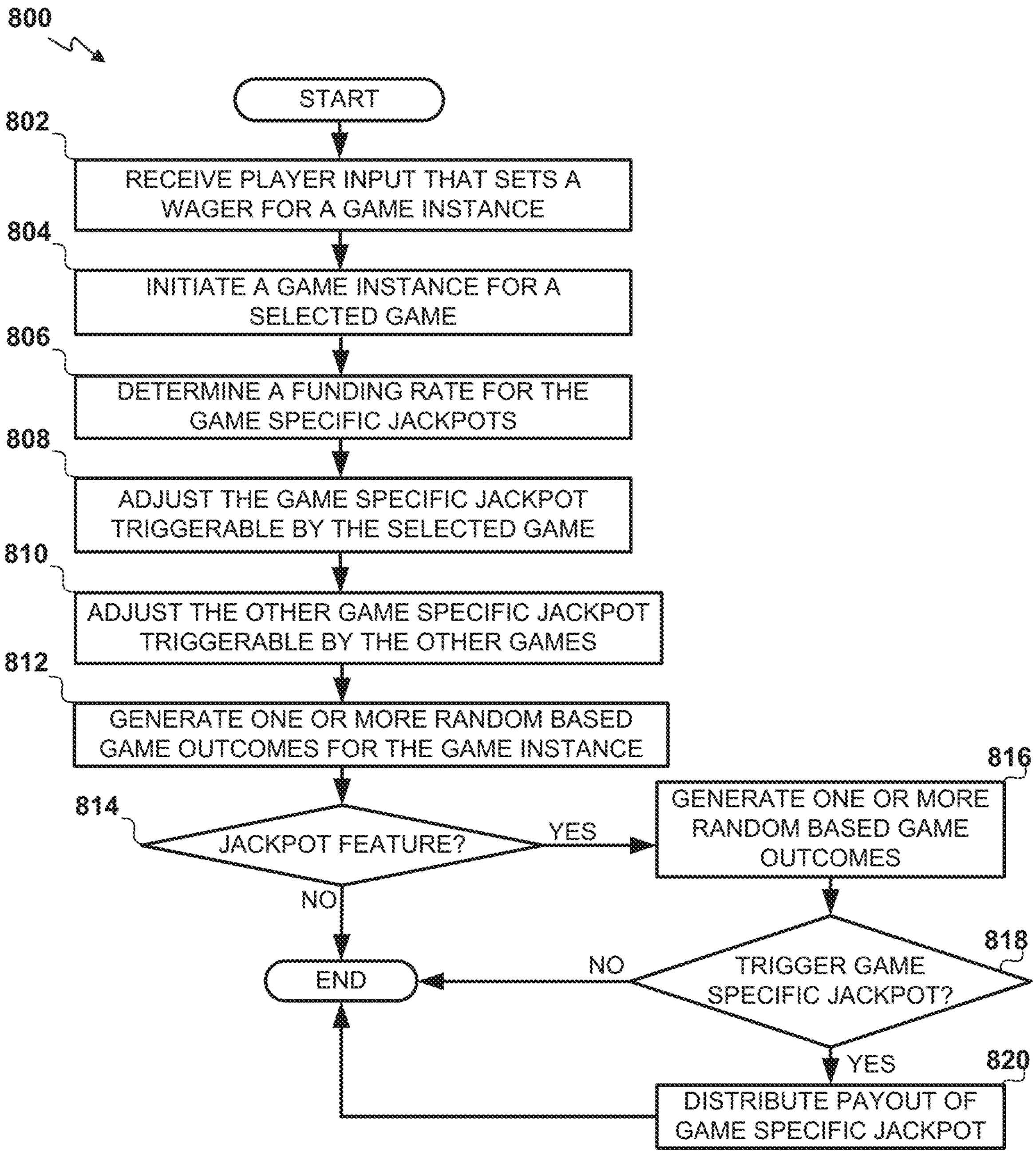
FIG. 8 depicts a flowchart illustrating a backend-based operation for linking game specific jackpots across multiple games.

FIG. 8 depicts a flowchart illustrating a backend-based operation 800 for linking game specific jackpots across multiple games. In one or more implementations, backend-based operation 800 may be implemented by a game processing backend system 314 shown in FIG. 3 and/or by a game controller 202 shown in FIG. 2A. The backend-based operation 800 can also be implemented by multi-game attribute engine 400. The use and discussion of FIG. 8 is only an example to facilitate explanation and is not intended to limit the disclosure to this specific example. For example, backend-based operation 800 does not necessarily need to perform the sequence of blocks in the order as depicted in FIG. 8. As an example, backend-based operation 800 may implement block 806 prior to implementing block 804. Additionally, or alternatively, one or more of the blocks may be optional and may not be performed in all implementations of backend-based operation 800. Using FIG. 8 as an example, block 802 may be optional if the wager amount from one game instance to another game instance is unchanged.

Backend-based operation 800 may start at block 802 and receive player input that sets a wager for a game instance. Afterwards, backend-based operation 800 moves to block 804 and initiates a game instance for a selected game. In on example, backend-based operation 800 could initiate a game instance when a player presses a spin button on a VBD. At block 806, backend-based operation 800 can determine a funding rate for the game specific jackpots while maintaining a target game RTP. To determine the funding rate at block 806, the backend-based operation 800 can use a static fixed funding rate, a tiered, fixed funding rate, and/or a random funding rate for one or more game specific jackpots. Recall that to implement a static fixed funding rate, the backend-based operation 800 can use a static global variable accessible across multiple games such that the static fixed funding rate does not change from game instance to game instance and/or from game to game. To determine tiered, fixed funding rate, the backend-based operation 800 can utilize a lookup table to determine the fixed funding rate based on the current prize value of the game specific jackpots. To determine a random funding rate, the backend-based operation 800 performs an RNG pull for a lookup table 322 that maps the RNG outcomes to a funding rate.

From block 806, backend-based operation 800 proceeds to block 808 and adjusts the game specific jackpot triggerable by the selected game. The backend-based operation 800 adjusts the game specific jackpot triggerable by the selected game by updating its global game attribute variable. At block 810, the backend-based operation 800 also adjusts the game specific jackpots triggerable by the other games by updating their global game attribute variables. The backend-based operation 800 is unable to trigger game specific jackpots designated for the other games.

At block 812, backend-based operation 800 generates one or more random based game outcomes for the game instance. In a slot game context, to determine the results for one or more reels, the backend-based operation 800 performs one or more RNG pulls depending on the number of reels. As an example, if a game play window for a base game includes five reels, the backend-based operation 800 performs a total of five RNG pulls, one RNG pull for each reel strip, to determine the reel stops for each reel strip; thereby, generating the random based game outcome.

After block 812, backend-based operation 800 moves to block 814 and determines whether the random based game outcomes trigger a jackpot feature. In one or more implementations, backend-based operation 800 can randomly determine whether to trigger a jackpot feature based on landing one or more dynamic symbols for a set of reels. Dynamic symbols are symbols that could change from one round of play to another round of play. For a given round of play, the backend-based operation 800 performs an RNG pull on a lookup table that maps the dynamic symbol to a jackpot dynamic symbol or some other symbol on the reel strip (e.g., a picture symbol). As an example, Table 5 shown below is an example lookup table that randomly determines whether a dynamic symbol should change into a jackpot dynamic symbol, picture symbol one, or a picture symbol two. According to Table 5, the dynamic symbol is less likely to change into a jackpot dynamic symbol when compared to the other symbols.

TABLE 5

Example Lookup Table for Jackpot Dynamic Symbol

| Count Value | Symbol |
|---|---|
| 100 | Picture Symbol 1 |
| 100 | Picture Symbol 2 |
| 1 | Jackpot Dynamic Symbol |

When the RNG pull on Table 5 determines that the dynamic symbol should change to a jackpot dynamic symbol, then backend-based operation 800 performs another RNG pull using another lookup table to determine whether to trigger the jackpot feature. In other words, the backend-based operation 800 randomly determines whether the jackpot dynamic symbol triggers a jackpot feature based on a weighted table. Table 6 shown below is an example lookup table that randomly determines whether to trigger the jackpot feature. The backend-based operation 800 can perform an RNG pull on Table 6 for each jackpot dynamic symbol that lands on the reels.

TABLE 6

Example Lookup Table for Triggering Jackpot feature

| Count Value | Symbol |
|---|---|
| 200 | Do not trigger |
| 1 | Trigger jackpot feature |

As shown in Table 6, the backend-based operation 800 is weighted such that triggering jackpot feature is less likely to occur than not triggering the jackpot feature. The weights used for Tables 5 and 6 can be configured to maintain a target game RTP.

If at block 814, backend-based operation 800 determines the jackpot feature is triggered, backend-based operation 800 moves to block 816. Otherwise, backend-based operation 800 ends. At block 816, backend-based operation 800 generates one or more random based game outcomes to determine whether the backend-based operation 800 triggers payout of the eligible, game specific jackpot. In one implementation, the random based game outcomes correspond to a pick three supplemental game feature where the player selects displayed coins until three of the same coins have been collected. Other implementations could use other supplemental game features to determine whether to trigger payout of the game specific jackpot. If at block 818, backend-based operation 800 determines that the eligible, game specific jackpot is triggered, backend-based operation 800 moves to block 820 to distribute payout of the eligible, game specific jackpot. Otherwise, backend-based operation 800 ends. As part of distributing the payout, backend-based operation 800 could reset the current prize value of the game specific jackpot to a default or initial value. Backend-based operation 800 could perform the reset by updating the global game attribute variable associated with the eligible, game specific jackpot.

Multiple Jackpot Metamorphics in a Multi-Game Package

Figure 9:
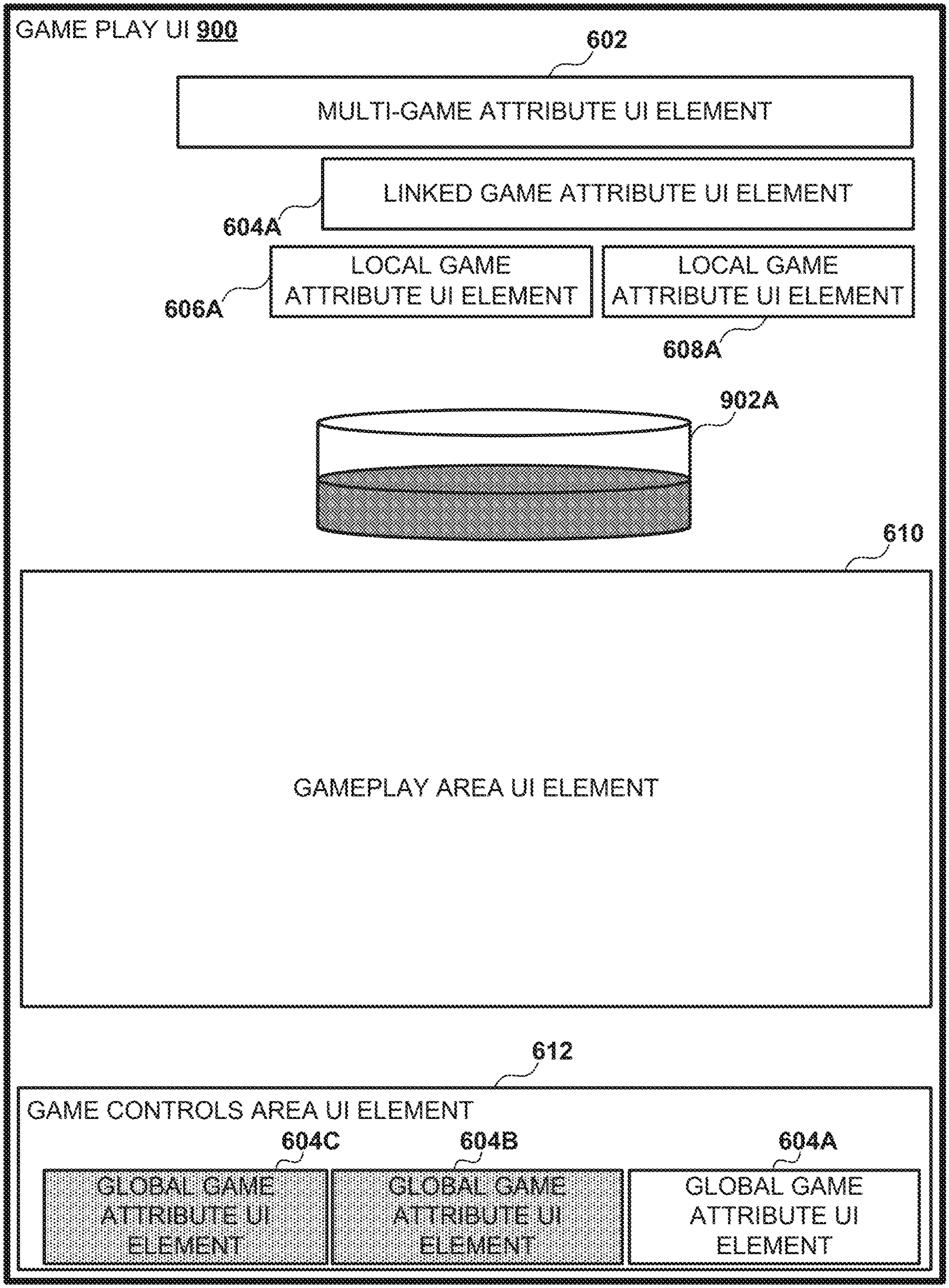
FIG. 9 is a diagram that depicts another example general layout of a game play UI 900 after entering a specific game.

FIG. 9 is a diagram that depicts another example general layout of a game play UI 900 after entering a specific game. The game play UI 900 is substantially similar to game play UI 600 shown in FIG. 6 except that game play UI 900 includes a game specific metamorphic graphical element 902A that represents a jackpot metamorphic linked to a specific game. In one or more implementations, the game specific metamorphic graphical element 902A provides an indication of how many times a metamorphic triggering event has occurred since the jackpot feature was last triggered in the specific game. The game specific metamorphic graphical element 902A has a current metamorphic state out of multiple possible metamorphic state values, where each metamorphic state corresponds to different depictions of the game specific metamorphic graphical element 902A on a progression from an initial metamorphic state value to a final metamorphic state value (e.g., empty to full; cold to hot; dark to light; small to large; or vice versa). Upon triggering the jackpot feature, the current metamorphic state of the game specific metamorphic graphical element 902A is set to the initial metamorphic state value. When a metamorphic triggering event occurs, the current metamorphic state of the game specific metamorphic graphical element 902A can advance to a higher state value, visually indicating an additional opportunity or perceived game equity. Using FIG. 18 as an example, the game specific metamorphic graphical element 902A is shown as a pile of gold coins that can grow. In other examples, the game specific metamorphic graphical element 902A is a bowl, bag, or other container, and the multiple state values correspond to different levels of fullness of the container. Upon initialization or state reset of the game specific metamorphic graphical element 902A, the container is empty or has minimal fullness. Thereafter, the container can advance to a higher fullness, at least until a maximal fullness has been reached.

Table 7 shows an example of mapping metamorphic state values for the game specific metamorphic graphical element 902A to a metamorphic triggering event count using a lookup table. Although Table 7 shows that the game specific metamorphic graphical element 902A has five metamorphic state values, the number of metamorphic state values for the game specific metamorphic graphical element 902A can depend on implementation.

TABLE 7

Example Lookup Table for Metamorphic States

| Metamorphic State Values | Threshold Count |
|---|---|
| 1 (initial state) | 0-20 |
| 2 | 21-40 |
| 3 | 41-60 |
| 4 | 61-80 |
| 5 (final state) | 81 and above |

In Table 7, the example metamorphic state values include an initial metamorphic state value and a final metamorphic state value, as well as one or more metamorphic state values between the initial metamorphic state value and the final metamorphic state value. Upon initialization or reset, the state of the game specific metamorphic graphical element 902A is metamorphic state value of one. Thereafter, as a metamorphic triggering event occurs, the metamorphic triggering event count increases. The state of the game specific metamorphic graphical element 902A advances to the next metamorphic state value (e.g., two) after the metamorphic triggering event count exceeds a threshold count (e.g., exceeds 20) associated with the next metamorphic state. The state of the game specific metamorphic graphical element 902A continues to advance until the final metamorphic state value is reached. The state of the game specific metamorphic graphical element 902A stays at the final metamorphic state value until the jackpot feature is eventually triggered.

Whether a metamorphic triggering event occurs depends at least in part on an RNG outcome that occurs within a base game and/or supplemental game feature. Referring to FIG. 8, recall that at block 814, backend-based operation 800 randomly determines whether a jackpot feature is triggered. One implementation utilizes a dynamic symbol that randomly changes to a jackpot dynamic symbol. If a jackpot dynamic symbol lands, the backend-based operation 800 randomly determines whether to trigger the jackpot feature. In one example, the metamorphic triggering event represents when the jackpot dynamic symbol randomly populates, but no jackpot feature triggers. If the jackpot dynamic symbol triggers the jackpot feature, the game specific metamorphic graphical element 902A is reset. Otherwise, a metamorphic triggering event occurs; thereby, increasing a metamorphic triggering event count. In another example, metamorphic triggering events occurs when the jackpot dynamic symbol appears regardless if the jackpot feature triggers.

Figure 10:
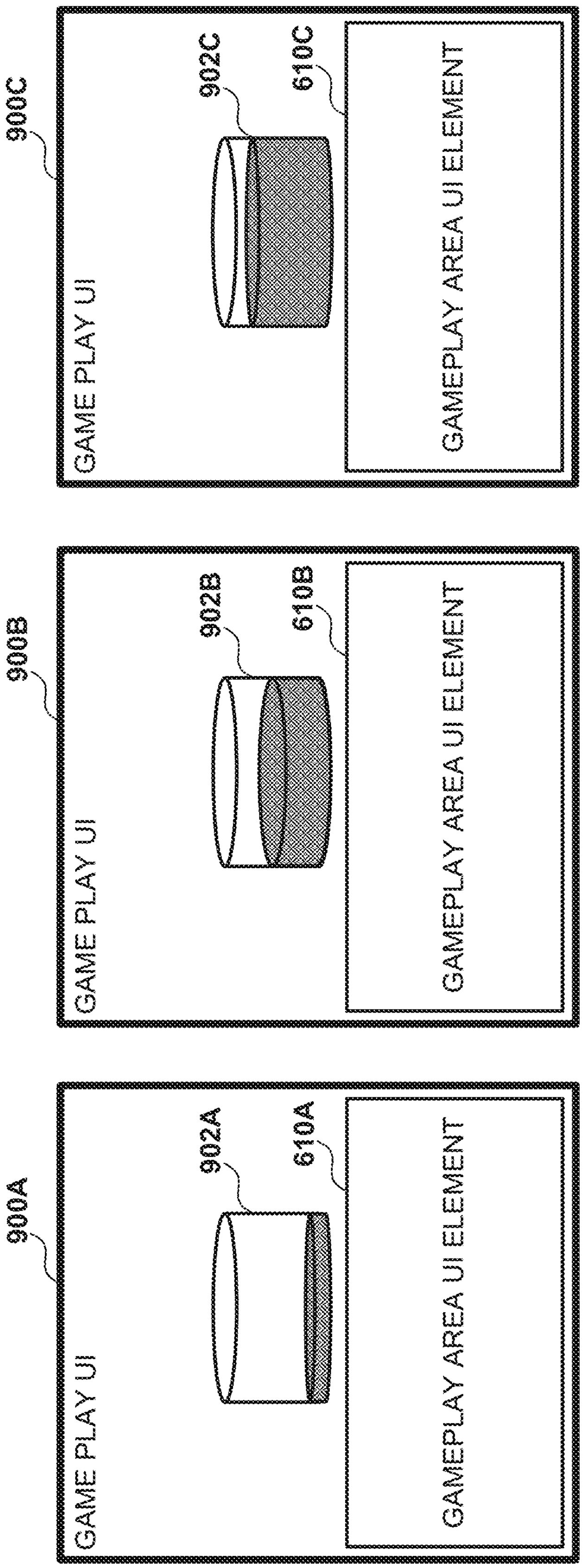
FIG. 10 is a diagram that depicts a snapshot in time of metamorphic states in multiple game play UIs in a multi-game package.

FIG. 10 is a diagram that depicts a snapshot in time of metamorphic states in multiple game play UIs 900A, 900B, and 900C in a multi-game package. Within each game play UI 900A, 900B, and 900C is a separate and independent game specific metamorphic graphical elements 902A, 902B, and 902C that is linked to a corresponding game. The game specific metamorphic graphical elements 902A, 902B, and 902C are independent of each other such that the state of each game specific metamorphic graphical element 902A, 902B, and 902C is determined based on metamorphic triggering events that occur in their corresponding game. In other words, the game specific metamorphic graphical elements 902A, 902B, and 902C are not linked across multiple games and are self-contained within their corresponding games. Each game specific metamorphic graphical elements 902A, 902B, and 902C is not affected by rounds of play generated by other, non-linked games.

The varying metamorphic states can originate from a different number of metamorphic triggering events that occur within each game of a multi-game package. In FIG. 10, game specific metamorphic graphical element 902A in game play UI 900A corresponds to metamorphic triggering events that occur in game A; game specific metamorphic graphical element 902B in game play UI 900B corresponds to metamorphic triggering events that occur in game B, and game specific metamorphic graphical element 902C in gameplay UI 900C corresponds to metamorphic triggering events that occur in game C. The different metamorphic states of the game specific metamorphic graphical elements 902A, 902B, and 902C shown in FIG. 10 indicate that each game has a different metamorphic triggering event count. Out of the three game specific metamorphic graphical elements 902A, 902B, and 902C, metamorphic graphical element 902A has the lowest metamorphic state value and metamorphic triggering event count and metamorphic graphical element 902C has the highest metamorphic state value and metamorphic triggering event count. Metamorphic graphical element 902B has a metamorphic state value and metamorphic triggering event count that is between the metamorphic state value and metamorphic triggering event count of metamorphic graphical elements 902A and 902C. Variation amongst the game specific metamorphic graphical elements 902A, 902B, and 902C can also be based on the state values of the game specific metamorphic graphical elements 902A, 902B, and 902C resetting at different times according to randomly triggering a jackpot feature. Although FIG. 10 illustrates that the metamorphic state values for game specific metamorphic graphical elements 902A, 902B, and 902C are different, other snapshots in time could have some or all of the game specific metamorphic graphical elements 902A, 902B, and 902C be at the same metamorphic state and/or have the same metamorphic triggering event count.

Figure 11:
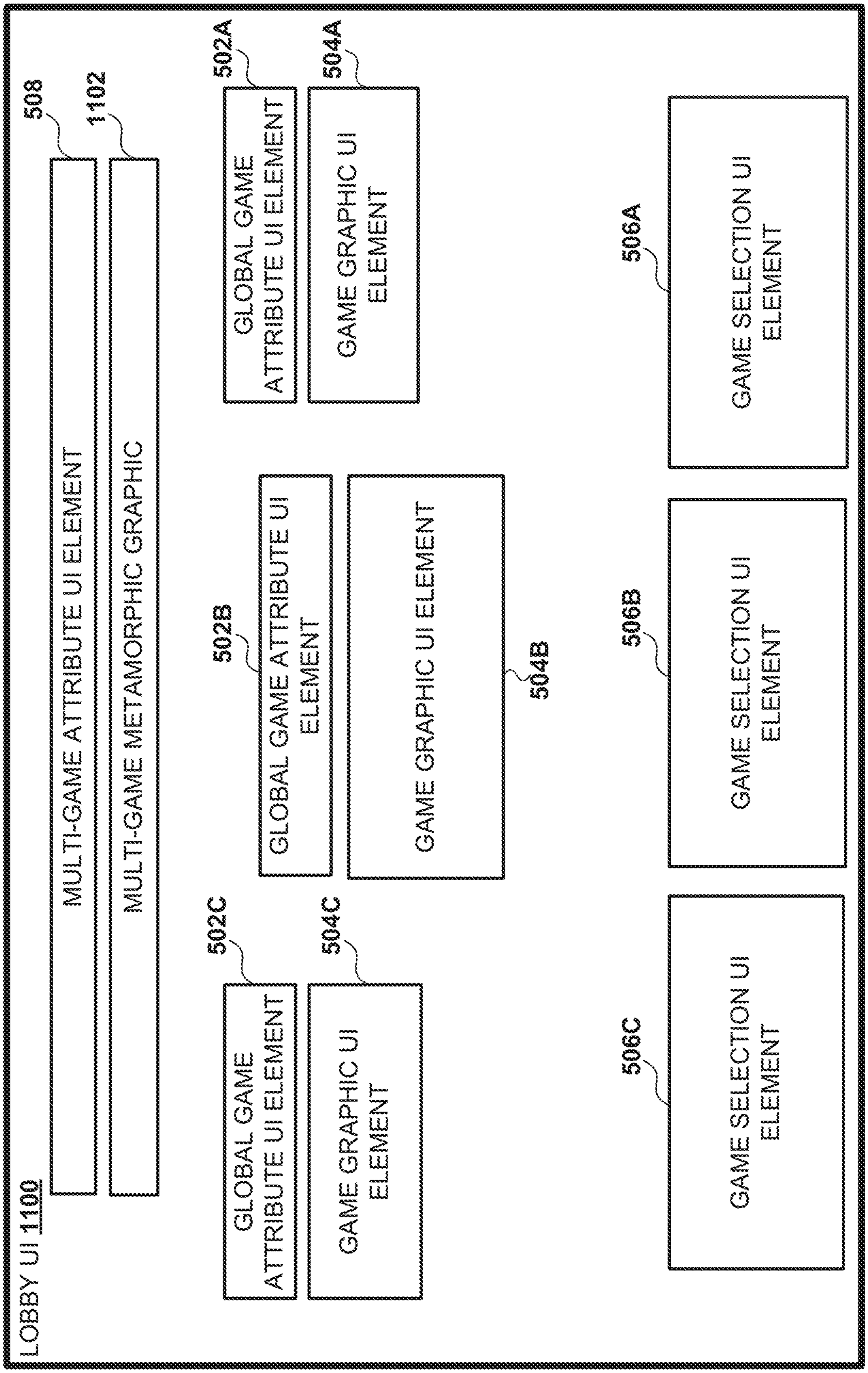
FIG. 11 is a diagram that depicts another example general layout of a lobby UI.

FIG. 11 is a diagram that depicts another example general layout of a lobby UI 1100. The lobby UI 1100 is substantially similar to the lobby UI 500 shown in FIG. 5 except that lobby UI 1100 includes a multi-game metamorphic graphic 1102. The multi-game metamorphic graphic 1102 differs from game specific metamorphic graphical elements 902A, 902B, and 902C in that the multi-game metamorphic graphic 1102 is linked across multiple and/or all games in a multi-game package. The multi-game metamorphic graphic 1102 can increment or reset its metamorphic state and increment its metamorphic triggering event count based on metamorphic triggering events that occur in multiple games. For example, a gaming device can be executing game instances in game A that generate random based game outcomes that are categorized as metamorphic triggering events for the multi-game metamorphic graphic 1102. A gaming device can subsequently exit game A and enter game B of a multi-game package and also generate metamorphic triggering events for the multi-game metamorphic graphic 1102. In one or more implementations, a metamorphic triggering event could be based on whether a game attribute (e.g., grand jackpot) associated with the multi-game attribute UI element 508 is triggered. In other implementations, the metamorphic triggering event could be based on whether a supplemental game feature (e.g., a multi-game jackpot feature) that can be triggered within the games.

Figure 12:
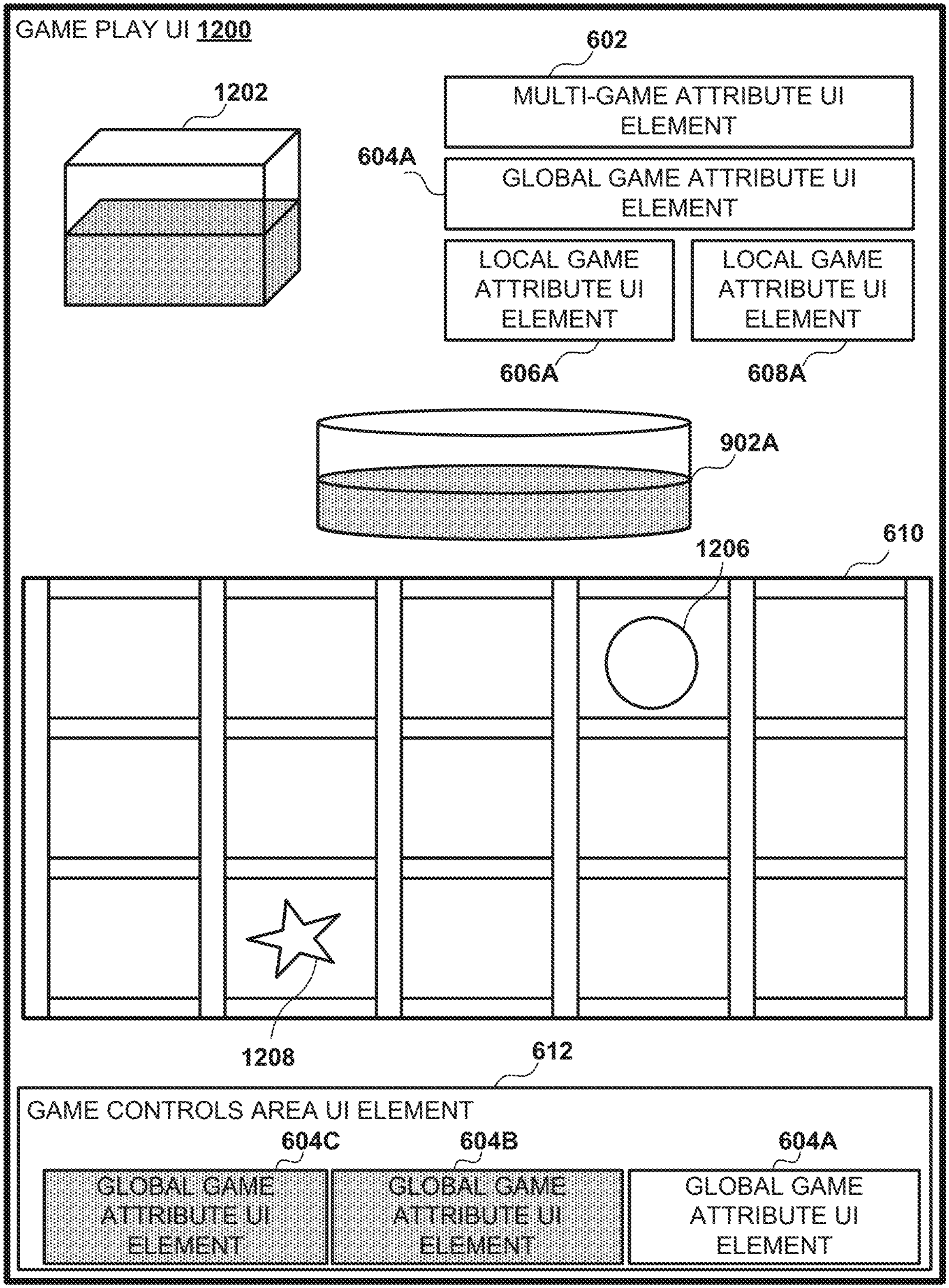
FIG. 12 is a diagram that depicts another example general layout of a game play UI after entering a specific game.

FIG. 12 is a diagram that depicts another example general layout of a game play UI 1200 after entering a specific game. The game play UI 1200 is substantially similar to game play UI 900 shown in FIG. 9 except that game play UI 900 includes a multi-game metamorphic graphical element 1202 that represents a jackpot metamorphic linked across multiple games. In one or more implementations, the multi-game metamorphic graphical element 1202 provides an indication of how many times a metamorphic triggering event has occurred since a multi-game jackpot feature was last triggered by a set of games. Similar to the game specific metamorphic graphical element 902A, the multi-game metamorphic graphical element 1202 has a current metamorphic state value out of multiple possible metamorphic state values. Each metamorphic state value corresponds to different depictions of the multi-game metamorphic graphical element 1202 on a progression from an initial metamorphic state value to a final metamorphic state value (e.g., empty to full; cold to hot; dark to light; small to large; or vice versa). Upon triggering the multi-game jackpot feature, the current metamorphic state of the multi-game metamorphic graphical element 1202 is set to the initial metamorphic state value. When a metamorphic triggering event occur, the current metamorphic state of the multi-game metamorphic graphical element 1202 can advance to a higher state value, visually indicating an additional opportunity or perceived game equity.

In one or more implementations, a gaming device could utilize a lookup table similar to Table 7 to map metamorphic state values for the multi-game metamorphic graphical element 1202 to a metamorphic triggering event count. For example, the multi-game metamorphic graphical element 1202 could have five metamorphic state values as shown in Table 7. The threshold counts for each metamorphic state could also be the same as shown in Table 7 for the multi-game metamorphic graphical element 1202. The state of the multi-game metamorphic graphical element 1202 can advance to the next metamorphic state value after the metamorphic triggering event count exceeds a threshold count associated with the next metamorphic state. The state of the multi-game metamorphic graphical element 1202 continues to advance until the final metamorphic state value is reached. The state of the multi-game metamorphic graphical element 1202 stays at the final metamorphic state value until the multi-game jackpot feature is eventually triggered. Other implementations could use a different number of metamorphic state values and/or threshold counts for each metamorphic state value associated with the multi-game metamorphic graphical element 1202.

FIG. 12 illustrates that the game play area UI element 610 presents a slot game that displays random based game outcomes on a 5×3 reel grid. Within the 5×3 reel grid are two different symbols, a jackpot dynamic symbol 1206 and a multi-game jackpot dynamic symbol 1208. Landing a jackpot dynamic symbol 1206 on one of the reels could trigger a metamorphic triggering event for game specific metamorphic graphical element 902A and landing the multi-game jackpot dynamic symbol 1208 can trigger a metamorphic triggering event for multi-game metamorphic graphical element 1202. In one or more implementations, whether a metamorphic triggering event occurs depends at least in part on an RNG outcome that occurs within a base game and/or supplemental game feature. A reel strip could include a dynamic symbol that randomly changes to a jackpot dynamic symbol 1206 or the multi-game jackpot dynamic symbol 102. If a jackpot dynamic symbol populates, the gaming device randomly determines whether to trigger the jackpot feature. When no jackpot feature triggers, then a metamorphic triggering event for game specific metamorphic graphical element 902A occurs. Alternatively, if a multi-game jackpot dynamic symbol 102 populates and a multi-game jackpot feature fails to trigger, then a metamorphic triggering event for multi-game metamorphic graphical element 1202 occurs.

Table 8 shown below is an example lookup table that a gaming device could use to randomly determines whether a dynamic symbol should change into a multi-game jackpot dynamic symbol 1208. According to Table 8, the dynamic symbol is less likely to change into a multi-game jackpot dynamic symbol when compared to the other symbols based on the weighted values. As shown in Table 8, the jackpot dynamic symbol 1206 and picture symbols 1 and 2 are more likely to appear. Other implementations, could use a variation of Table 8, for example, a lookup table that includes more entries associated with other symbols or a lookup table that includes only two entries, one for the jackpot dynamic symbol 1206 and one for the multi-game jackpot dynamic symbol 1208

TABLE 8

Example Lookup Table for Multi-Game Jackpot Dynamic Symbol

| Count Value | Symbol |
|---|---|
| 100 | Picture Symbol 1 |
| 100 | Picture Symbol 2 |
| 4 | Jackpot Dynamic Symbol |
| 1 | Multi-Game Jackpot Dynamic Symbol |

When the RNG pull on Table 8 determines that the dynamic symbol should change to a multi-game jackpot dynamic symbol 1208, then the gaming device could perform another RNG pull using another lookup table to determine whether to trigger the multi-game jackpot feature. The additional lookup table could be similarly structured to Table 6. A metamorphic triggering event for the multi-game jackpot dynamic symbol 1208 occurs when the multi-game jackpot feature fails to trigger.

By providing visual feedback about how many times the metamorphic triggering event has occurred since a jackpot feature and multi-game jackpot feature was last triggered, the game specific metamorphic graphical element 902A and multi-game metamorphic graphical element 1202 can maintain the interest of current players playing on the gaming devices. This enhances the user experience for players, potentially preventing players from switching gaming devices, and provide a new and/or improved UI that presents how a player continuously builds game equity. For example, the game specific metamorphic graphical element 902A and multi-game metamorphic graphical element 1202 present changes in a player's game equity, where the game equity continues to increase as rounds of play continue to progress without triggering a jackpot feature or multi-game jackpot feature. As rounds of play progress, the game specific metamorphic graphical element 902A and/or multi-game metamorphic graphical element 1202 present metamorphic state increases, which could represent increases in a game's perceived or potential value. In particular, the game specific metamorphic graphical element 902A could present a potential or perceived value based on tracking when the last time a jackpot feature triggers, and multi-game metamorphic graphical element 1202 could present a potential or perceived value based on tracking when the last time a multi-game jackpot feature triggers.

Figure 13:
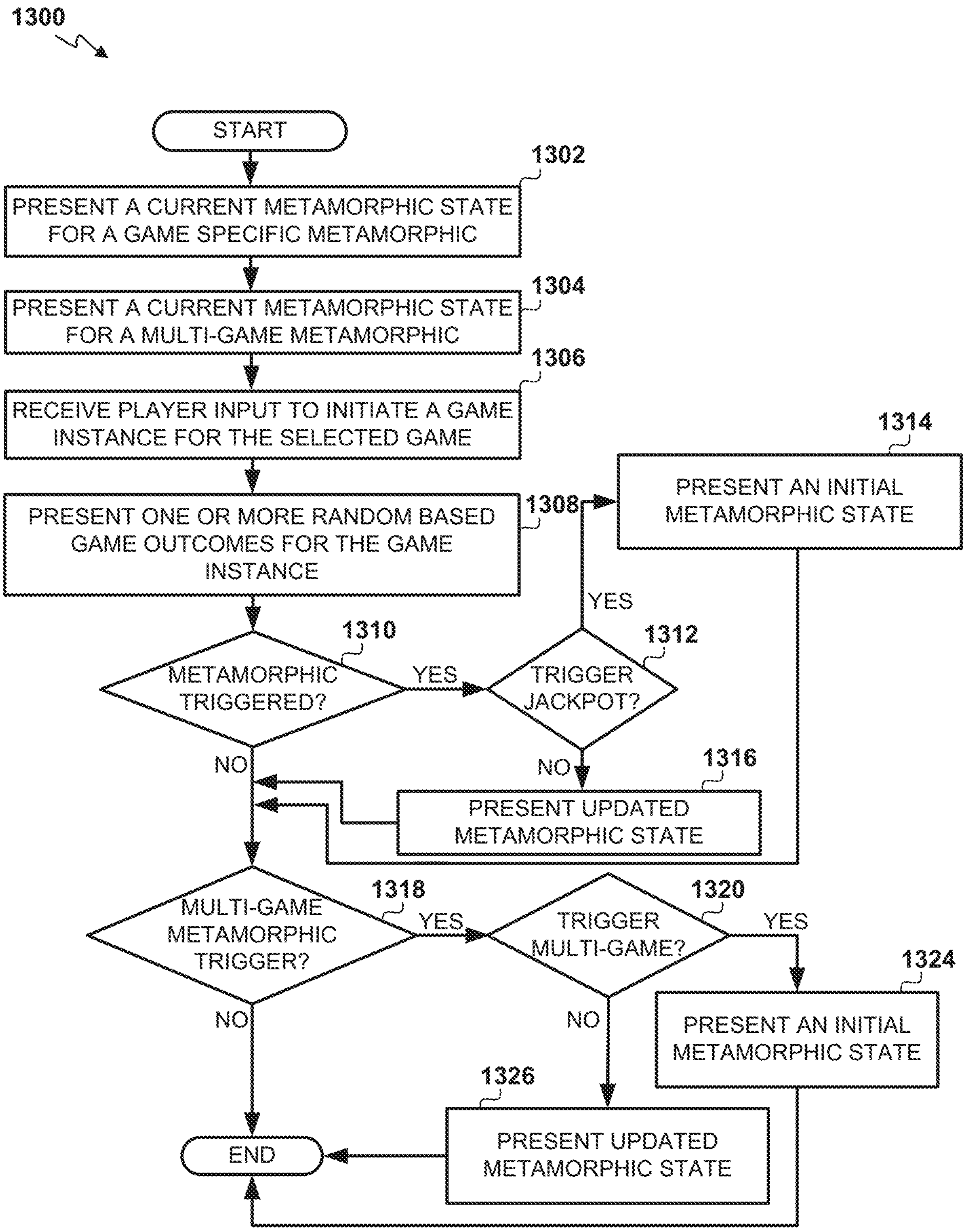
FIG. 13 depicts a flowchart illustrating a UI based operations for presenting a game specific metamorphic and a multi-game metamorphic for a game in a multi-game package.

FIG. 13 depicts a flowchart illustrating a UI based operations 1300 for presenting a game specific metamorphic and a multi-game metamorphic for a game in a multi-game package. In one implementation, the UI based operation 1300 may be implemented by a UI system 302 shown in FIG. 3 and/or displayed on the primary game display 240 and secondary game display 242 of a gaming device 200 shown in FIG. 2A. The UI based operation 1300 also corresponds to the lobby UI 1100 and game play UI 1200 shown in FIGS. 11 and 12. The use and discussion of FIG. 13 is only an example to facilitate explanation and is not intended to limit the disclosure to this specific example. For example, UI based operation 1300 does not necessarily need to perform the sequence of blocks in the order as depicted in FIG. 13. Specifically, UI based operations 1300 may implement blocks 1310, 1312, 1318, and 1320 before blocks 1308. Additionally, or alternatively, one or more of the blocks may be optional and may not be performed in all implementations of UI based operation 1300. As an example, blocks 1310, 1312, 1318, and 1320 may be optional and performed by a backend-based operation, such as backend-based operation 1400 shown in FIG. 14.

UI based operation 1300 may start at block 1302 and present a current metamorphic state for a game specific metamorphic graphical element in a selected game. Using FIG. 12 as an example, UI based operation 1300 could present game specific metamorphic graphical element 902A within game play UI 1200 to represent the game specific metamorphic. At block 1304, the UI based operation 1300 presents a current metamorphic state for a multi-game metamorphic. Referring to FIG. 12, UI based operation 1300 could present multi-game metamorphic graphical element 1202 within game play UI 1200 to represent the multi-game metamorphic. At block 1306, UI based operation 1300 receives player input to initiate a game instance for the selected game. For example, the player input can correspond to a player tapping a spin button to initiate the game instance.

The UI based operation 1300 may proceed to block 1308 and present one or more random based game outcomes for the initiated game instance. The random based game outcomes could be for a slot game, keno, or other types of wagering games. Additionally, or alternatively, the random based game outcomes could be for single player games or multi-player games (e.g., tournaments). At block 1310, the UI based operation 1300 determines whether a metamorphic triggering event occurs for a game specific metamorphic.

With reference to FIG. 12, a metamorphic triggering event occurs when a jackpot dynamic symbol 1206 lands on one of the reels in game play area UI element 610. In FIG. 13, if a metamorphic triggering event does not occur, UI based operation 1300 moves to block 1318. Alternatively, if a metamorphic triggering event occurs, then UI based operation 1300 moves to block 1312 to determine whether a jackpot feature randomly triggers.

At block 1312, if UI based operation 1300 determines that the jackpot feature triggers, UI based operation 1300 moves to block 1314 and presents an initial metamorphic state for the game specific metamorphic. If UI based operation 1300 determines that no jackpot feature triggers, UI based operation 1300 moves to block 1316 and presents an updated metamorphic state. In certain scenarios, the UI based operation 1300 may not change the metamorphic state since the metamorphic triggering event count does not exceed a threshold value associated with the next metamorphic state.

Returning to block 1318, the UI based operation 1300 determines whether a multi-game metamorphic triggering event occurs. Referring to FIG. 12 as an example again, a metamorphic triggering event occurs when a multi-game jackpot dynamic symbol 1208 lands on one of the reels in game play area UI element 610. Other implementations could have other metamorphic triggering events, such as landing a specific combination of symbols. At block 1318, if UI based operation 1300 determines that no metamorphic triggering event occurs, UI based operation 1300 could end. Alternatively, if UI based operation 1300 determines that a metamorphic triggering event occurs, UI based operation 1300 moves to block 1320 and determines whether the random based game outcomes trigger a multi-game jackpot feature. If a multi-game jackpot feature triggers, UI based operation 1300 moves to block 1324 and presents an initial metamorphic state value for the multi-game metamorphic. Otherwise, UI based operation 1300 moves to block 1326 and presents an updated metamorphic state for the multi-game metamorphic. Similar to block 1316, the UI based operation 1300 may not change the metamorphic state in certain scenarios since the metamorphic triggering event count does not exceed a threshold value associated with the next metamorphic state.

Figure 14:
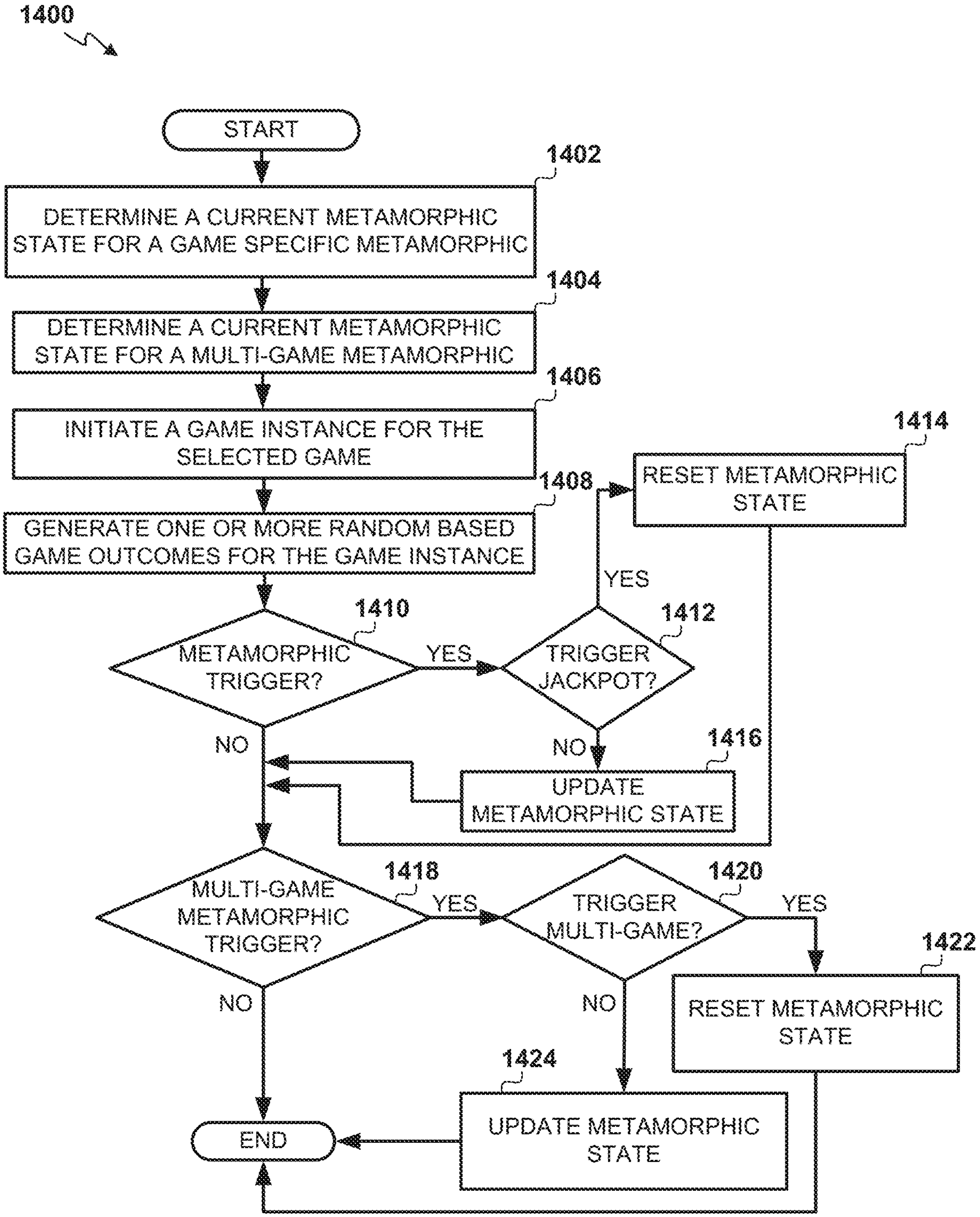
FIG. 14 depicts a flowchart illustrating a backend-based operation related to implementing a game specific metamorphic and a multi-game metamorphic for a game in a multi-game package.

FIG. 14 depicts a flowchart illustrating a backend-based operation 1400 related to implementing a game specific metamorphic and a multi-game metamorphic for a game in a multi-game package. The backend-based operation 1400 may be implemented by a game processing backend system 314 shown in FIG. 3 and/or by a game controller 202 shown in FIG. 2A. The use and discussion of FIG. 14 is only an example to facilitate explanation and is not intended to limit the disclosure to this specific example. For example, backend-based operation 1400 does not necessarily need to perform the sequence of blocks in the order as depicted in FIG. 14. As an example, backend-based operation 1400 may implement block 1418 prior to implementing block 1410. Additionally, or alternatively, one or more of the blocks may be optional and may not be performed in all implementations of backend-based operation 1400. Using FIG. 14 as an example, blocks 1402 and 1404 may be optional prior to executing a game instance.

Backend-based operation 1400 may start at block 1402 and determine a current metamorphic state for a game specific metamorphic graphical element in a selected game. Backend-based operation 1400 could determine a current metamorphic state by mapping metamorphic triggering event counts to threshold count. Recall that Table 7 is an example of a lookup table that maps metamorphic triggering event counts to threshold counts. At block 1404, the backend-based operation 1400 determines a current metamorphic state for a multi-game metamorphic. Similar to block 1402, backend-based operation 1400 at block 1404 maps metamorphic triggering event counts to threshold count. Backend-based operation 1400 could use a lookup table for block 1404 that is separate from the lookup table used in block 1402. At block 1406, backend-based operation 1400 initiate a game instance for the selected game triggered by a player's input. For example, a player may tap a spin button that causes backend-based operation 1400 to initiate the game instance.

Backend-based operation 1400 may proceed to block 1408 and generate one or more random based game outcomes for the initiated game instance. The random based game outcomes could be for a slot game, keno, or other types of wagering games. Additionally, or alternatively, the random based game outcomes could be for single player games or multi-player games (e.g., tournaments). At block 1410, backend-based operation 1400 determines whether a metamorphic triggering event occurs for a game specific metamorphic. With reference to FIG. 12, a metamorphic triggering event occurs when a jackpot dynamic symbol 1206 lands on one of the reels in game play area UI element 610. In FIG. 14, if a metamorphic triggering event does not occur, backend-based operation 1400 moves to block 1418. Otherwise, if a metamorphic triggering event occurs, then backend-based operation 1400 moves to block 1412 to determine whether a jackpot feature randomly triggers.

At block 1412, if backend-based operation 1400 determines that the jackpot feature triggers, backend-based operation 1400 moves to block 1414 and resets the metamorphic state for the game specific metamorphic to an initial metamorphic state. If backend-based operation 1400 determines that no jackpot feature triggers, backend-based operation 1400 moves to block 1416 and presents an updated metamorphic state. In certain scenarios, the backend-based operation 1400 may not change the metamorphic state since the metamorphic triggering event count does not exceed a threshold value associated with the next metamorphic state.

Returning to block 1418, the backend-based operation 1400 determines whether a multi-game metamorphic triggering event occurs. Referring to FIG. 12 as an example again, a metamorphic triggering event occurs when a multi-game jackpot dynamic symbol 1208 lands on one of the reels in game play area UI element 610. Other implementations could have other a metamorphic triggering events, such as landing a specific combination of symbols. At block 1418, if backend-based operation 1400 determines that no metamorphic triggering event occurs, backend-based operation 1400 could end. Otherwise, if backend-based operation 1400 determines that a metamorphic triggering event occurs, backend-based operation 1400 moves to block 1420 and determines whether the random based game outcomes trigger a multi-game jackpot feature. If a multi-game jackpot feature triggers, backend-based operation 1400 moves to block 1422 and resets the metamorphic state value for the multi-game metamorphic to an initial metamorphic state value. Alternatively, backend-based operation 1400 moves to block 1424 and updates the metamorphic state for the multi-game metamorphic. Similar to block 1416, the backend-based operation 1400 may not change the metamorphic state in certain scenarios since the metamorphic triggering event count does not exceed a threshold value associated with the next metamorphic state.

Varying Volatility in a Multi-Play Environment for a Game

Figure 15:
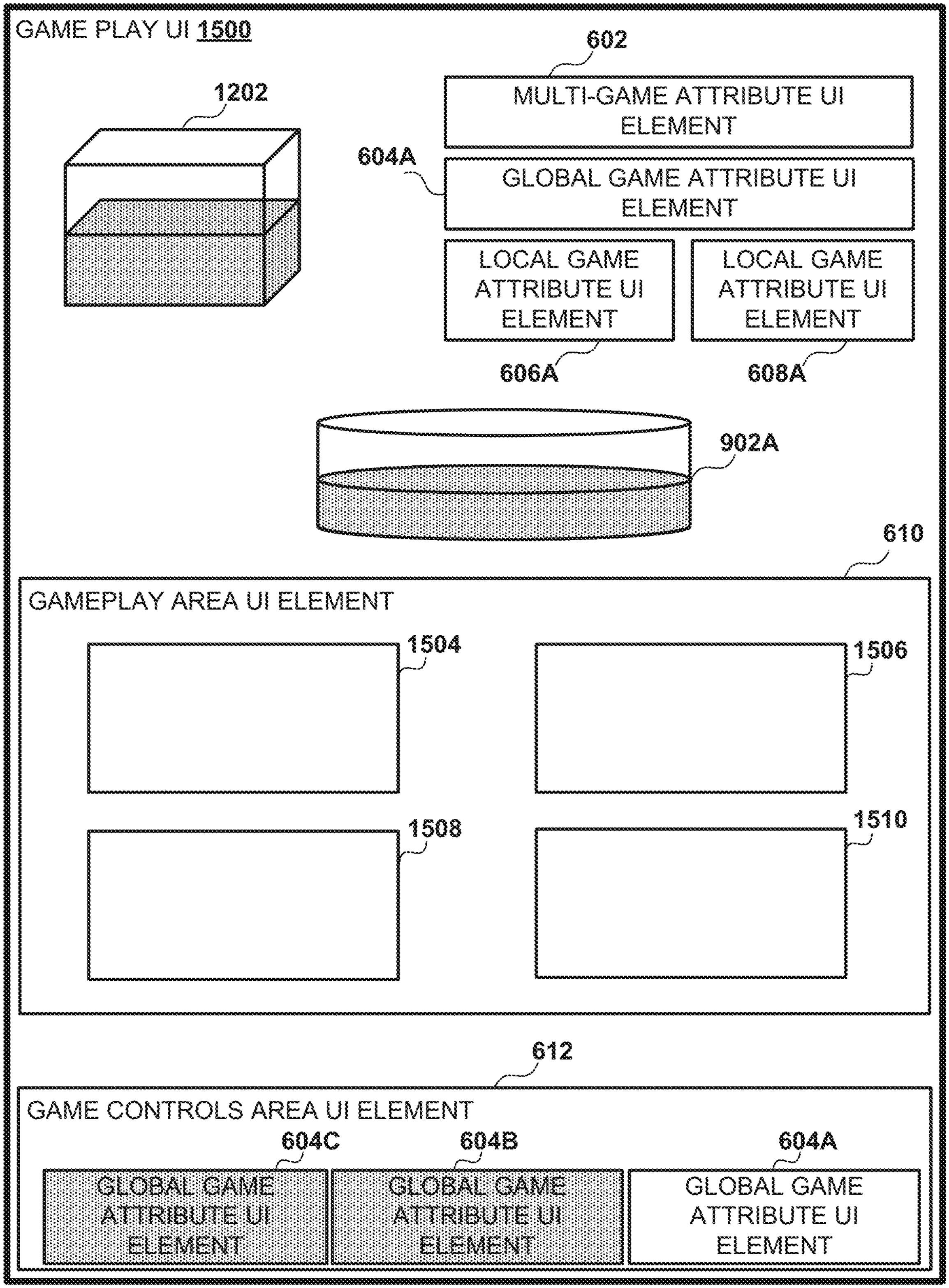
FIG. 15 is a diagram that depicts another example general layout of a game play UI after entering a specific game.

FIG. 15 is a diagram that depicts another example general layout of a game play UI 1500 after entering a specific game. The game play UI 1500 is substantially similar to game play UI 900 shown in FIG. 9 except that game play UI 1500 includes four different game play windows 1504, 1506, 1508, and 1510 rather than a single game play window to produce a multi-play environment. In game play UI 1500, the gaming device generates a random based game outcome in each game play window 1504, 1506, 1508, and 1510 for a given game instance. Each game play window 1504, 1506, 1508, and 1510 presents and provides the same game (e.g., having the same game rules, mechanics, and paytables). Using FIG. 18 as an example, game play UI 1800 shows that each game play window 1504, 1506, 1508, and 1510 provides the same game by includes the same type of symbols and the same 5×3 reel grid. The RTP for each game play window 1504, 1506, 1508, and 1510 is combined to provide a target base game RTP. For example, a game is set to have a target game RTP of 90%, where a portion of the target game RTP is allocated to a base game. The portion of the target game RTP allocated to the base game is referred as the target base game RTP. In FIGS. 15 and 18, the combined window RTP generated from each game play window 1504, 1506, 1508, and 1510 would be the target base game RTP.

To vary volatility for a given game instance, the gaming device is setup to select a reel pattern set to use for a set of reels (e.g., reels 1-5) in each game play window. In one example, a gaming device can be configured to allocate 40% of the target game RTP as the target base game RTP. Rather than using the same reel strips for all four game play windows that produces the same window RTP, the gaming device could utilize multiple reel patterns that vary the window RTP for each game play window 1504, 1506, 1508, and 1510 from game instance to game instance. For example, the gaming device could include a reel pattern A and a reel pattern B, where reel pattern A provides an RTP of 90% for a given spin (also referred throughout this disclosure as "spin RTP") and reel pattern B provides an RTP of 30% for a given spin. For one game instance, all game play windows 1504, 1506, 1508, and 1510 randomly select reel pattern B to provide a window RTP of 30% for each game play window 1504, 1506, 1508, and 1510. In another game instance, all game play windows 1504, 1506, 1508, and 1510 randomly select reel pattern A to provide a window RTP of 90% for each game play window 1504, 1506, 1508, and 1510. Other game instances could provide have some game play windows 1504, 1506, 1508, and 1510 with reel pattern A and some game play windows 1504, 1506, 1508, and 1510 with reel pattern B. By utilizing a weighted table that randomly determines what reel patterns to use for each game play window, the base game RTP is set to be 40% of the target game RTP while varying volatility amongst the game play windows.

Figure 16:
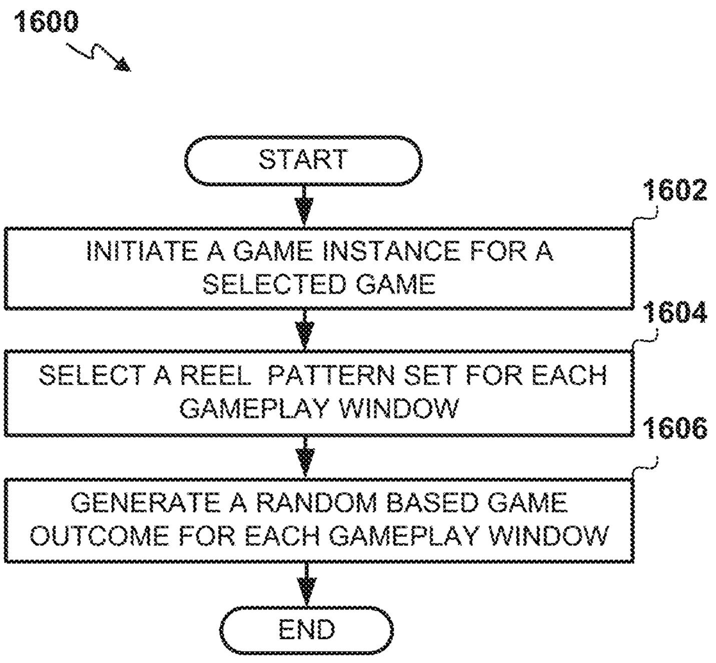
FIG. 16 depicts a flowchart illustrating a backend-based operation related to varying volatility in a multi-play environment for a given game.

FIG. 16 depicts a flowchart illustrating a backend-based operation 1600 related to varying volatility in a multi-play environment for a given game. The backend-based operation 1600 may be implemented by a game processing backend system 314 shown in FIG. 3 and/or by a game controller 202 shown in FIG. 2A. The use and discussion of FIG. 16 is only an example to facilitate explanation and is not intended to limit the disclosure to this specific example. Backend-based operation 1600 starts at block 1602 and initiate a game instance for the selected game triggered by a player's input. For example, a player may tap a spin button that causes backend-based operation 1400 to initiate the game instance.

At block 1604, the backend-based operation 1600 selects a reel pattern set for each game play window. Specifically, the backend-based operation 1600 randomly determines a reel pattern set to use for each game play window in given spin. A reel pattern set corresponds to the reel patterns selected for a set of reels. Referring to FIG. 18 as an example, the game play window 1504 presents five different reels, reels 1-5. A reel pattern set provides the symbol pattern for all five of the reel strips. At block 1604, backend-based operation 1600 could have multiple reel pattern sets to populate the five-reel strips, such as "reel pattern set A" and "reel pattern set B." The two different reel pattern sets could have the same symbol patterns for all reel strips but with different weights. Alternatively, the two different reel pattern sets could have different symbol patterns with different weights for at least one-reel strip. To randomly determine a reel pattern set to use, backend-based operation 1600 could perform an RNG pull on a lookup table. Table 9 provides an example of lookup table that randomly selects whether backend-based operation 1600 uses reel pattern set A or B for a given spin.

TABLE 9

Example Lookup Table for Selecting Reel Pattern Sets

| Count Value | Reel Pattern Set Entry |
|---|---|
| 3 | Reel pattern set A |
| 60 | Reel pattern set B |

Based on Table 9, a backend-based operation 1600 is less likely to select reel pattern set A. Backend-based operation 1600 may select reel pattern set A less often since reel pattern set A may provide a larger RTP for a given spin.

After completing block 1604, backend-based operation 1600 may move to block 1606 to generate a random based game outcome for each game play window. In one or more implementations, at block 1604, after selecting the reel strip pattern, the backend-based operation 1600 performs one or more RNG pulls depending on the number of reels. As an example, if the each game play window includes five reels, the backend-based operation 1600 performs a total of 20 RNG pulls, one RNG pull for each reel strip in each game play window, to determine the reel stops for each reel strip; thereby, generating the random based game outcome.

Figure 17:
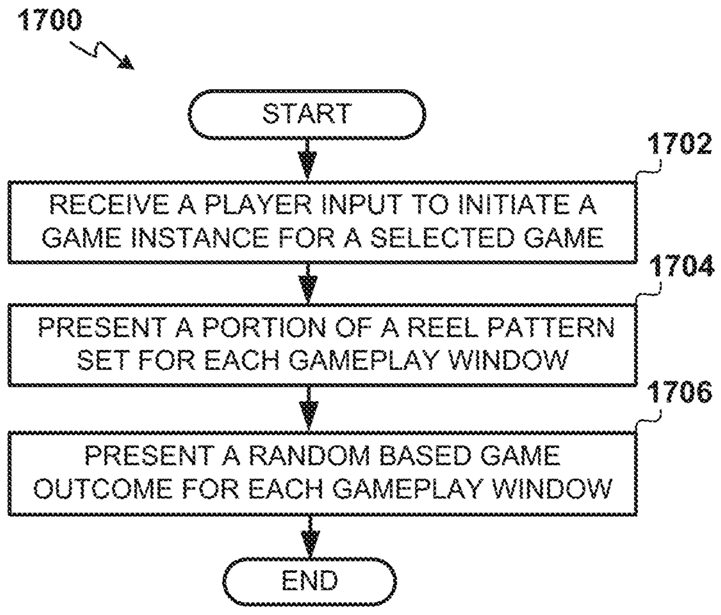
FIG. 17 depicts a flowchart illustrating a UI based operation related to varying volatility in a multi-play environment for a given game.

FIG. 17 depicts a flowchart illustrating a UI based operation 1700 related to varying volatility in a multi-play environment for a given game. In one implementation, the UI based operation 1700 may be implemented by a UI system 302 shown in FIG. 3 and/or displayed on the primary game display 240 and secondary game display 242 of a gaming device 200 shown in FIG. 2A. The UI based operation 1700 also corresponds to the game play UIs 1500 and 1800 shown in FIGS. 15 and 18. The use and discussion of FIG. 15 is only an example to facilitate explanation and is not intended to limit the disclosure to this specific example. UI based operation 1700 starts at block 1702 and receives a player input to initiate a game instance for the selected game. Afterwards, UI based operation moves to block 1704 and presents a portion of a reel pattern set randomly selected for each gameplay window. UI based operation the moves to block 1706 to present a random based game outcome for each game play window.

Alternatives and Variations

Numerous embodiments are described in this disclosure and are presented for illustrative purposes only. The described embodiments are not, and are not intended to be, limiting in any sense. As an example, although the disclosure generally describes the multi-game and multi-play environment in a Class III reel or slot game context the disclosure is not limited to this type of game and/or gaming device. For example, other implementations and/or portions of the multi-game and multi-play environment may be implemented as a Class II gaming device. In particular, a gaming device may present UIs, such as lobby UIs 500, 1100, and 1900, and game play UIs 600, 900, 1200, 1500, and 1800 while implementing a Class II bingo game. Additionally, or alternatively, portions of the multi-game and multi-play environment can be utilized for other types of wagering game, such as keno, lottery, and pachinko.

The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only and are not to be taken as limiting the disclosure in anyway.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget"" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A non-transitory computer-readable medium, readable by at least one processor and comprising instructions stored thereon to cause the at least one processor to:

load a lobby that includes a first game and a second game in a multi-game package, wherein the first game is eligible to trigger a payout of a first stand-alone progressive jackpot and ineligible to trigger a payout of a second stand-alone progressive jackpot, wherein the second game is eligible to trigger a payout of the second stand-alone progressive jackpot and ineligible to trigger a payout of the first stand-alone progressive jackpot;

initiate a round of play in the first game associated of the multi-game package;

determine a value of a first non-zero funding rate for the first stand-alone progressive jackpot based on initiation of the round of play, and determine a value of a second non-zero funding rate for the second stand-alone progressive jackpot based on initiation of the round of play;

adjust the first stand-alone progressive jackpot according to the first non-zero funding rate, wherein adjusting the first stand-alone progressive jackpot according to the first non-zero funding rate further comprises adjusting at least one global game attribute variable, wherein the first non-zero funding rate is a static funding rate that does not change for multiple rounds of play in the first game and the second game, and wherein the at least one global game attribute variable has links between at least the first game and the second game;

adjust the second stand-alone progressive jackpot according to the second non-zero funding rate, wherein adjusting the second stand-alone progressive jackpot is further based, at least in part, on the adjusted at least one global game attribute variable;

generate a first set of random based game outcomes for the round of play using a random number generator (RNG) and a hardware RNG, wherein the hardware RNG is configured to securely produce random numbers as a source of entropy for the RNG;

determine whether a jackpot feature in the first game is triggered based on the first set of random based game outcomes;

generate, using the RNG and the hardware RNG, a second set of random based game outcomes based on a determination that the jackpot feature in the first game is triggered; and determine whether the second set of random based game outcome triggers the payout of the first stand-alone progressive jackpot.

2. The non-transitory computer-readable medium of claim 1, wherein the lobby includes a third game in the multi-game package, wherein the third game is eligible to trigger a payout of a third stand-alone progressive jackpot and ineligible to trigger the payouts of the first stand-alone progressive jackpot and the second stand-alone progressive jackpot.

3. The non-transitory computer-readable medium of claim 1, wherein the first game and the second game are eligible to trigger a payout of a wide area progressive jackpot, and wherein the instructions stored thereon further cause the at least one processor to:

adjust the wide area progressive jackpot, wherein the adjustment of the wide area progressive jackpot is made according to at least one global multi-game attribute variable.

4. The non-transitory computer-readable medium of claim 1, wherein the instructions further cause the at least one processor to:

determine whether the first set of random based game outcomes includes landing on a jackpot dynamic symbol on a reel strip; and randomly determine whether to trigger the jackpot feature in the first game after landing the jackpot dynamic symbol.

5. The non-transitory computer-readable medium of claim 4, wherein the instructions further cause the at least one processor to randomly determine whether a dynamic symbol on the reel strip is populated to the jackpot dynamic symbol.

6. The non-transitory computer-readable medium of claim 5, wherein the instructions further cause the at least one processor to randomly determine whether the dynamic symbol on the reel strip is populated to a multi-game jackpot dynamic symbol.

7. The non-transitory computer-readable medium of claim 6, wherein the instructions further cause the at least one processor to:

determine whether the first set of random based game outcomes includes landing the multi-game jackpot dynamic symbol on the reel strip; and determine a metamorphic triggering event occurs for a multi-game metamorphic when landing the multi-game jackpot dynamic symbol.

8. The non-transitory computer-readable medium of claim 7, wherein the instructions further cause the at least one processor to adjust a metamorphic state value of the multi-game metamorphic based on the occurrence of the metamorphic triggering event in the first game.

9. The non-transitory computer-readable medium of claim 8, wherein the instructions further cause the at least one processor to adjust the metamorphic state value of the multi-game metamorphic based on the occurrence of a second metamorphic triggering event in the second game.

10. The non-transitory computer-readable medium of claim 4, wherein the instructions further cause the at least one processor to:

determine a metamorphic triggering event occurs for a game specific metamorphic in the first game when landing the jackpot dynamic symbol; and adjust a metamorphic state value of the game specific metamorphic in the first game based on the occurrence of the metamorphic triggering event.

11. The non-transitory computer-readable medium of claim 10, wherein the game specific metamorphic in the first game and a game specific metamorphic in the second game have different metamorphic state values.

12. The non-transitory computer-readable medium of claim 11, wherein the occurrence of the metamorphic triggering event in the first game does not adjust a metamorphic state value of the game specific metamorphic in the second game.

13. The non-transitory computer-readable medium of claim 1, wherein the first set of random based game outcomes are for a plurality game play windows.

14. The non-transitory computer-readable medium of claim 1, wherein the instructions further cause the at least one processor to:

randomly determine a reel pattern set for each game play window; and generate the first set of random based game outcomes for the round of play based on each determined reel pattern set for each game play window.

15. A non-transitory computer-readable medium, readable by at least one processor and comprising instructions stored thereon to cause the at least one processor to:

load a lobby that includes a first game and a second game in a multi-game package, wherein the first game is eligible to trigger a payout of a first stand-alone progressive jackpot and ineligible to trigger a payout of a second stand-alone progressive jackpot, wherein the second game is eligible to trigger a payout of the second stand-alone progressive jackpot and ineligible to trigger a payout of the first stand-alone progressive jackpot;

initiate a round of play in the first game associated of the multi-game package;

determine a value of a first non-zero funding rate for the first stand-alone progressive jackpot based on initiation of the round of play, and determine a value of a second non-zero funding rate for the second stand-alone progressive jackpot based on initiation of the round of play;

adjust the first stand-alone progressive jackpot according to the first non-zero funding rate, wherein adjusting the first stand-alone progressive jackpot according to the first non-zero funding rate further comprises adjusting at least one global game attribute variable, and wherein the at least one global game attribute variable has links between at least the first game and the second game;

adjust the second stand-alone progressive jackpot according to the second non-zero funding rate, wherein adjusting the second stand-alone progressive jackpot is further based, at least in part, on the adjusted at least one global game attribute variable, wherein at least one of the first non-zero funding rate and the second non-zero funding rate comprises a tiered funding rate;

generate a first set of random based game outcomes for the round of play using a random number generator (RNG) and a hardware RNG, wherein the hardware RNG is configured to securely produce random numbers as a source of entropy for the RNG;

determine whether a jackpot feature in the first game is triggered based on the first set of random based game outcomes;

generate, using the RNG and the hardware RNG, a second set of random based game outcomes based on a determination that the jackpot feature in the first game is triggered; and determine whether the second set of random based game outcome triggers the payout of the first stand-alone progressive jackpot.

16. The non-transitory computer-readable medium of claim 15, wherein the instructions further cause the at least one processor to:

generate a random outcome with the random number generator;

map the random outcome to a lookup table that includes a set of funding rates, wherein the lookup table is associated with a prize value of the first stand-alone progressive jackpot; and determine, based on mapping the random outcome to the lookup table, the first non-zero funding rate.

17. The non-transitory computer-readable medium of claim 16, wherein the instructions further cause the at least one processor to:

generate a second random outcome with the random number generator;

map the second random outcome to a second lookup table that includes a second set of funding rates, wherein the second lookup table is associated with a prize value of the second stand-alone progressive jackpot; and determine, based on mapping the second random outcome to the second lookup table, the second non-zero funding rate.

18. A non-transitory computer-readable medium, readable by at least one processor and comprising instructions stored thereon to cause the at least one processor to:

load a lobby that includes a first game and a second game in a multi-game package, wherein the first game is eligible to trigger a payout of a first stand-alone progressive jackpot and ineligible to trigger a payout of a second stand-alone progressive jackpot, wherein the second game is eligible to trigger a payout of the second stand-alone progressive jackpot and ineligible to trigger a payout of the first stand-alone progressive jackpot;

initiate a round of play in the first game associated of the multi-game package;

randomly determine a value of a first non-zero funding rate for the first stand-alone progressive jackpot based on initiation of the round of play, and determine a value of a second non-zero funding rate for the second stand-alone progressive jackpot based, at least in part, on initiation of the round of play;

adjust the first stand-alone progressive jackpot according to the first non-zero funding rate, wherein adjusting the first stand-alone progressive jackpot according to the first non-zero funding rate further comprises adjusting at least one global game attribute variable, and wherein the at least one global game attribute variable has links between at least the first game and the second game;

adjust the second stand-alone progressive jackpot according to the second non-zero funding rate, wherein adjusting the second stand-alone progressive jackpot is further based, at least in part, on the adjusted at least one global game attribute variable;

generate a first set of random based game outcomes for the round of play using a random number generator (RNG) and a hardware RNG, wherein the hardware RNG is configured to securely produce random numbers as a source of entropy for the RNG;

determine whether a jackpot feature in the first game is triggered based on the first set of random based game outcomes;

generate, using the RNG and the hardware RNG, a second set of random based game outcomes based on a determination that the jackpot feature in the first game is triggered; and determine, using the RNG, whether the second set of random based game outcome triggers the payout of the first stand-alone progressive jackpot.

19. The non-transitory computer-readable medium of claim 18, wherein the instructions further cause the at least one processor to:

randomly determine the value of a second non-zero funding rate for the second stand-alone progressive jackpot.

20. The non-transitory computer-readable medium of claim 18, wherein the instructions further cause the at least one processor to:

determine the first non-zero funding rate based on one or more game parameters associated with the first game.

* * * * *